United States Patent [19]
Kawai et al.

[11] Patent Number: 5,172,023
[45] Date of Patent: Dec. 15, 1992

[54] ULTRASONIC MOTOR

[75] Inventors: Yasuaki Kawai; Akihiro Takeuchi; Kiyokazu Asai, all of Aichi, Japan

[73] Assignee: Kabushiki Kaisha Toyota Chuo Kenkyusho, Aichi, Japan

[21] Appl. No.: 771,766

[22] Filed: Oct. 4, 1991

[30] Foreign Application Priority Data

| | | | |
|---|---|---|---|
| Nov. 9, 1990 | [JP] | Japan | 2-304875 |
| Mar. 19, 1991 | [JP] | Japan | 3-024843[U] |
| Mar. 19, 1991 | [JP] | Japan | 3-024844 |
| Apr. 26, 1991 | [JP] | Japan | 3-039062[U] |

[51] Int. Cl.$^5$ .................................... H01L 41/08
[52] U.S. Cl. ................................................ 310/323
[58] Field of Search ............................ 310/323, 328

[56] References Cited

U.S. PATENT DOCUMENTS

| | | | |
|---|---|---|---|
| 4,645,964 | 2/1987 | Hiramatsu et al. | 310/323 |
| 5,032,754 | 7/1991 | Iwao et al. | 310/323 |

FOREIGN PATENT DOCUMENTS

| | | |
|---|---|---|
| 0178988 | 10/1984 | Japan ........... 310/323 |
| 61-191277 | 8/1986 | Japan . |
| 63-242185 | 10/1988 | Japan . |
| 63-262069 | 10/1988 | Japan . |
| 0305772 | 12/1988 | Japan ........... 310/323 |
| 0214271 | 8/1989 | Japan ........... 310/323 |

OTHER PUBLICATIONS

Applied Physics 54 (1985) No. 6, pp. 589-590.

*Primary Examiner*—Mark O. Budd
*Attorney, Agent, or Firm*—Oblon, Spivak, McClelland, Maier & Neustadt

[57] ABSTRACT

An ultrasonic motor which has a viration mode of progressive wave with a large vibrational amplitude of an elastic member and which provides a high torque, comprises: at least one vibrator including a disk-shaped elastic member having a driving force transmitting portion, disk-shaped piezoelectric ceramics attached to both surfaces of the elastic member and a plurality of projections provided on both sides of the driving force transmitting portion; and at least one rotor that is in press contact with the driving force transmitting portion of the vibrator. The thickness of the elastic member at a portion between the piezoelectric ceramics is substantially equal to the thickness thereof at the driving force transmitting portion.

22 Claims, 31 Drawing Sheets

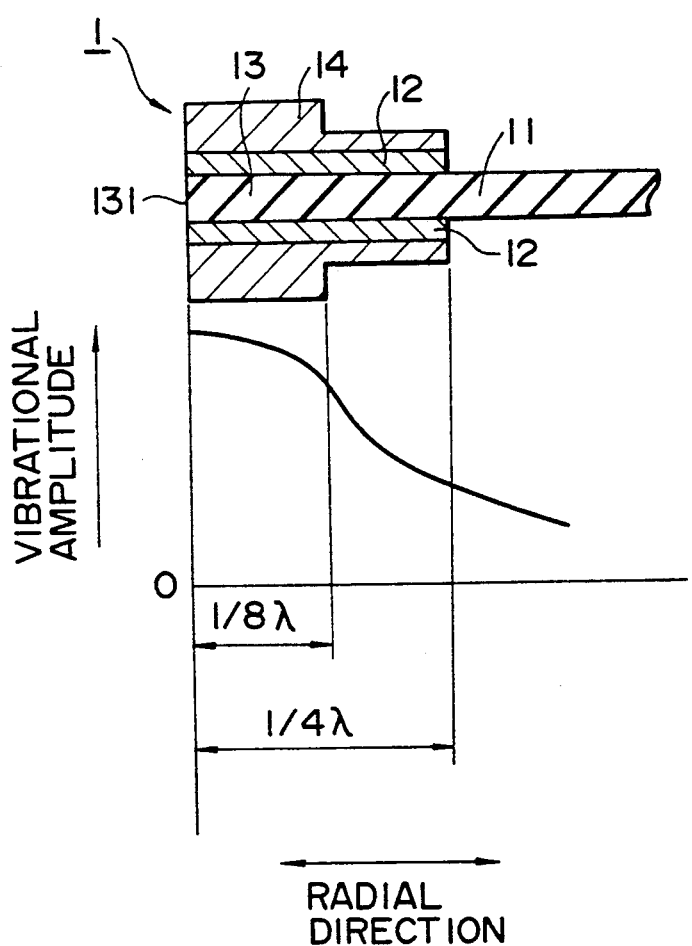

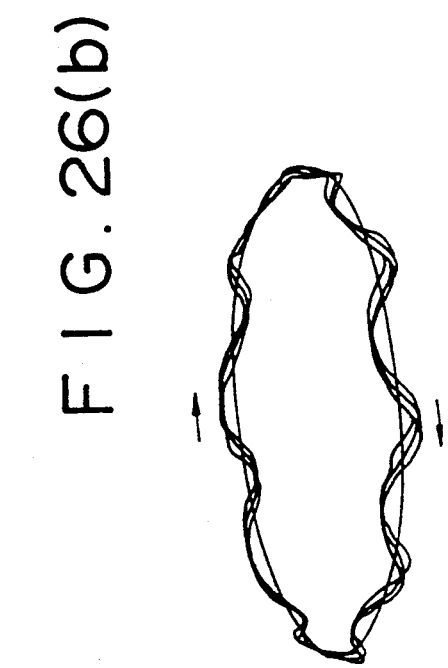
F I G. 26(b)
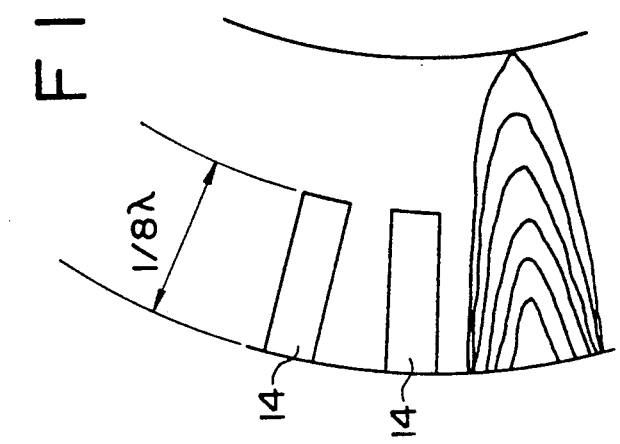
F I G. 26(d)
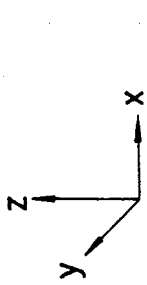
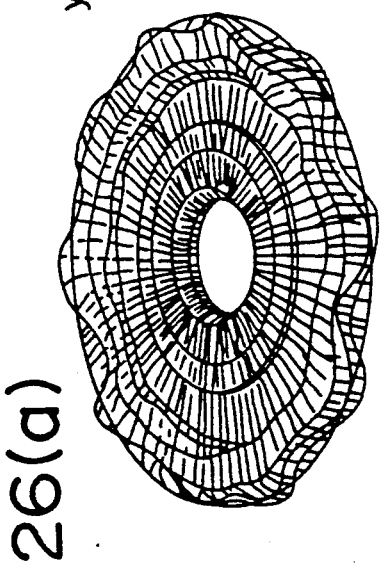
F I G. 26(a)
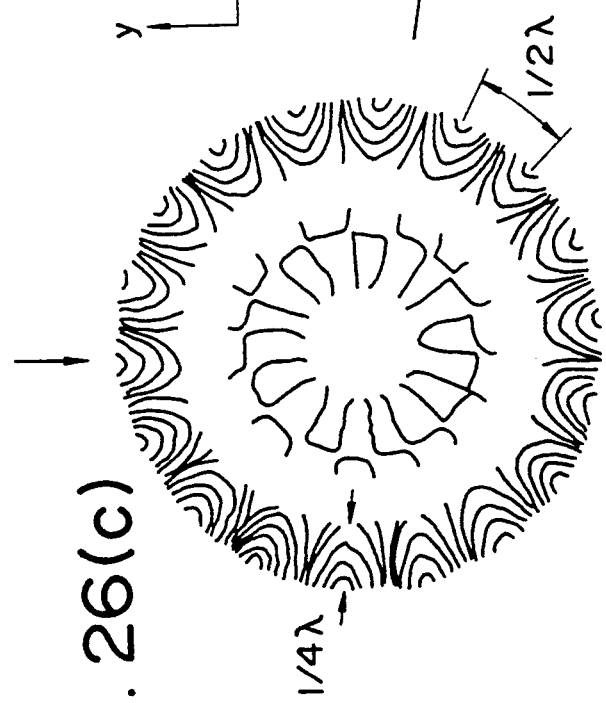
F I G. 26(c)

CROSS-SECTIONAL CONFIGURATION

PLANER CONFIGURATION

CROSS-SECTIONAL CONFIGURATION

PLANER CONFIGURATION

F I G. 56
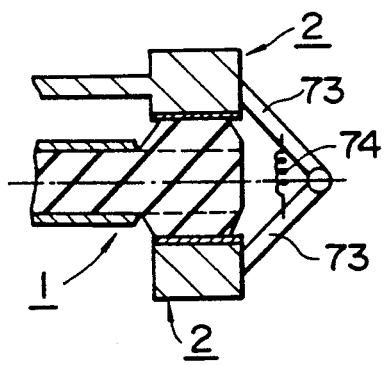
F I G. 57
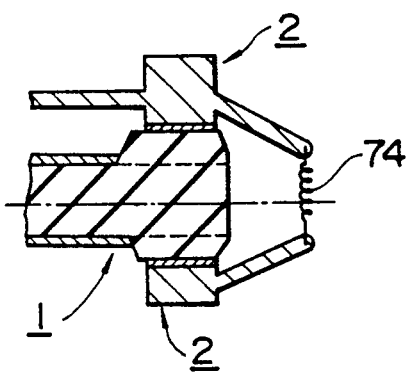
F I G. 58
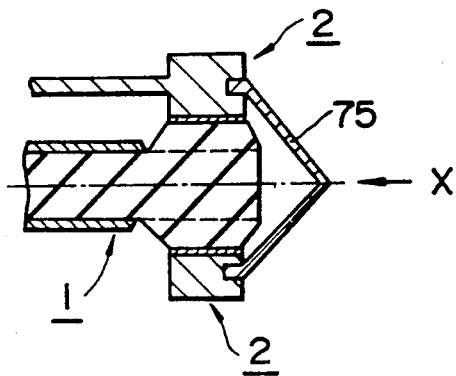

ULTRASONIC MOTOR

BACKGROUND OF THE INVENTION

1. Field of the Invention:

The present invention relates to an ultrasonic motor which is capable of obtaining a high torque by stably generating vibrations with a large vibrational amplitude.

2. Description of the Related Art:

Ultrasonic motors convert electric energy into mechanical energy in the form of ultrasonic vibrations to obtain a torque. By virtue of the advantages of silent operation and capabilities of providing a high torque by low-speed rotation and of permitting direct drive, consideration has been given to the application of ultrasonic motors to a wide variety of fields, for example, automotive functional parts, various kinds of robot, magnetism-optical disk memory, etc.

There have heretofore been proposed some types of ultrasonic motor, i.e., progressive wave type ultrasonic motor, standing wave type ultrasonic motor, and hybrid transducer type ultrasonic motor. In particular, the progressive wave type ultrasonic motor has been well examined technically because it provides stable motor performance for a long period of time.

As shown exemplarily in FIG. 3, a typical conventional progressive wave type ultrasonic motor comprises a vibrator (stator) 1 and a rotor 2. The stator 1 comprises a disk-shaped elastic member 11 made of a metallic material, for example, and provided with circumferentially spaced radial slits, and a ring-shaped piezoelectric ceramic 12 bonded underneath the elastic member 11. The rotor 2 comprises a disk-shaped elastic member 21 and a lining member 22 made of engineering plastics, for example, which is bonded to the elastic member 21. The rotor 2 is in press contact with the stator 1. By impressing a high frequency voltage matched with the resonance of vibration (resonance point) of the stator 1 on the piezoelectric ceramic 12, the stator 1 is caused to vibrate resonantly, thereby rotating the rotor 2 (Applied Physics 54 (1985) No. 6, pp. 589-590).

The piezoelectric ceramic 12 has an electrode structure such as that shown in FIG. 4. More specifically, the side of the piezoelectric ceramic 12 which is bonded to the elastic member 11 is provided with regions defined by the half-wavelength, a region (denoted by C in the figure) defined by the three-quarter wavelength, and a region (denoted by D) defined by the quarter-wavelength. On the other side of the elastic member 11, the regions defined by the half-wavelength are divided into two (denoted by A and B), as shown by the oblique lines, and provided in between the regions defined respectively by the quarter-wavelength and the three-quarter wavelength. In addition, the regions defined by the half-wavelength are subjected to polarization process to provide transverse piezoelectric effects which are alternately different in directivity.

When a high-frequency voltage is input to the regions A and B of the ring-shaped piezoelectric ceramic 12 with a phase difference of 90° therebetween in a state where the stator 1 is placed in electrical resonance, a progressive wave traveling in one direction is excited on the surface of the elastic member 11. Accordingly, the motion of any one point on the surface of the elastic member 11 draws a locus such as that shown in FIG. 5. Since the vibrational amplitude shifts 90° spatially and the phase shifts 90° temporally, the bending vibration that is generated in the piezoelectric ceramic 12 generates an elliptical locus (a counterclockwise locus as viewed in FIG. 5) when the motion of the surface of the elastic member 11 is drawn on the basis of a virtual neutral axis. On the rotor 2, a frictional force acts in a direction (leftward as viewed in FIG. 5) counter to the direction (rightward as viewed in FIG. 5) of progress of the progressive wave, so that a torque is given to the rotor 2. Thus, the arrangement operates as a motor. It should be noted that the downward arrow shown in FIG. 5 represents the applied pressure.

The progressive wave type ultrasonic motor has the structural drawback that, since the rotor is pressed in direct contact with the upper side of the bending vibration generating portion of the elastic member, the vibration amplitude of the elastic member is undesirably held down to a small level. For this reason, it is necessary in order to obtain a high torque to raise the voltage applied to the piezoelectric ceramic to thereby increase the vibration compelling force produced in the elastic member. However, if the applied voltage is raised, the piezoelectric ceramic may be broken.

To overcome this drawback, an improved elastic member structure has been proposed wherein the elastic member 11 is separated into a portion which is brought into press contact with the rotor and a portion which is bonded to the piezoelectric ceramic in order to prevent the pressure applied to the rotor from directly affecting the piezoelectric ceramic, and two piezoelectric ceramics 121 and 122 are disposed over the entire circumference of the elastic member 11, as shown in FIGS. 6 to 10, thereby increasing the driving area, and thus improving the wavelength selectivity (e.g., Japanese Patent Laid-Open (KOKAI) Nos. 61-191277, 63-242185 and 63-262069, and U.S. Pat. No. 4,504,760). It should be noted that FIG. 10 shows vibratory pieces (driving force transmitting portions for transmitting vibrations to the rotor) 13 projecting radially from the elastic member 11 shown in FIGS. 8 and 9.

In any of these prior arts, however, no technical consideration has yet been given to the elastic member 11 as being an electric resonance system including electric and mechanical systems.

That is, the structure of the elastic member 11 is not designed by taking into consideration the best conditions for the interaction between the electric input system and the mechanical output system. To achieve the best conditions, it is particularly necessary to replace the elastic member 11 with an electric resonance system and electrically handle it as an admittance current in which energy periodically move between a condenser and a coil while being continuously consumed by a resistor. In the related arts, however, since the structure of the elastic member 11 is not regarded as an electric resonance system, an impedance gap is produced electrically and the resonance frequency increases mechanically, resulting in a very small vibrational amplitude. Accordingly, it is impossible to obtain a high torque when a motor is formed by use of the related art arrangement.

SUMMARY OF THE INVENTION

In view of the above-described problems of the related art, it is an object of the present invention to provide an ultrasonic motor which has a vibration mode of progressive wave with a large vibrational amplitude of the elastic member and which provides a high torgue.

To this end, the present invention provides an ultrasonic motor comprising: at least one vibrator including a disk-shaped elastic member having a driving force transmitting portion, disk-shaped piezoelectric ceramics attached to both surfaces of the elastic member and a plurality of projections provided on both sides of the driving force transmitting portion; and at least one rotor that is in press contact with the driving force transmitting portion of the vibrator, wherein the thickness of the elastic member at a portion between the piezoelectric ceramics is substantially equal to the thickness thereof at the driving force transmitting portion.

According to the present invention, a normal reference vibration mode of the connective vibration (vibration produced by the interaction of two or more piezoelectric ceramics) that acts on the elastic member can be reliably obtained by a simple arrangement wherein the thickness of the elastic member at a portion between the piezoelectric ceramics is substantially equal to the thickness thereof at the driving force transmitting portion (in general, it is difficult to obtain a reference vibration mode for an object having a complicated configuration because of a large number of specific modes of vibration). Accordingly, the driving force transmitting portion can be readily caused to vibrate, and a vibrational amplitude which is excellent in followability can be propagated directly to the surface of the elastic member. Therefore, it is possible to obtain bending vibration which forms a basic vibration mode of progressive wave, and a large vibrational amplitude portion can be formed at a driving force transmitting portion that is in contact with the rotor. Thus, it is possible to form a motor which has an ideal vibration mode of progressive wave and which provides a high torque. In addition, driving force that is derived from vibrations can be transmitted to the rotor in a balanced state by providing projections on both sides of the driving force transmitting portion of the vibrator.

The above and other objects, features and advantages of the present invention will become more apparent from the following description when taken in conjunction with the accompanying drawings in which preferred embodiments of the invention are shown by way of illustrative example.

BRIEF DESCRIPTION OF THE DRAWINGS

FIG. 2 shows a stator of the ultrasonic motor shown in FIG. 1, in which

FIG. 25 shows an amplitude distribution of a vibratory wave at a driving force transmitting portion of a vibrator in the ultrasonic motor;

FIG. 26 shows an amplitude distribution of a vibratory wave at a driving force transmitting portion of a vibrator in an ultrasonic motor, in which FIG. 26(a) shows a vibration mode of the vibrator, FIG. 26(b) shows the state of vibrational amplitude in the circumferential direction of the vibrator, FIG. 26(c) shows the state of vibrational amplitude in the radial direction of the vibrator, and FIG. 26(d) is an enlarged view of a part of FIG. 26(c);

FIG. 27 shows a configuration of projections provided on a driving force transmitting portion of a vibrator in an ultrasonic motor, in which

FIG. 28 shows a configuration of projections provided on a driving force transmitting portion of a vibrator in an ultrasonic motor, in which

FIG. 48 are diagrams showing the displacement of the vibrational amplitude of the vibrator of the ultrasonic motor in one embodiment of the present invention, in which

FIG. 56 is a sectional view of an area of contact between a vibrator and rotor of an ultrasonic motor according to one specific example of the present invention;

FIG. 57 is a sectional view of an area of contact between a vibrator and rotor of an ultrasonic motor according to one specific example of the present invention;

FIG. 58 is a sectional view of an area of contact between a vibrator and rotor of an ultrasonic motor according to one specific example of the present invention;

DETAILED DESCRIPTION

Figure 1:
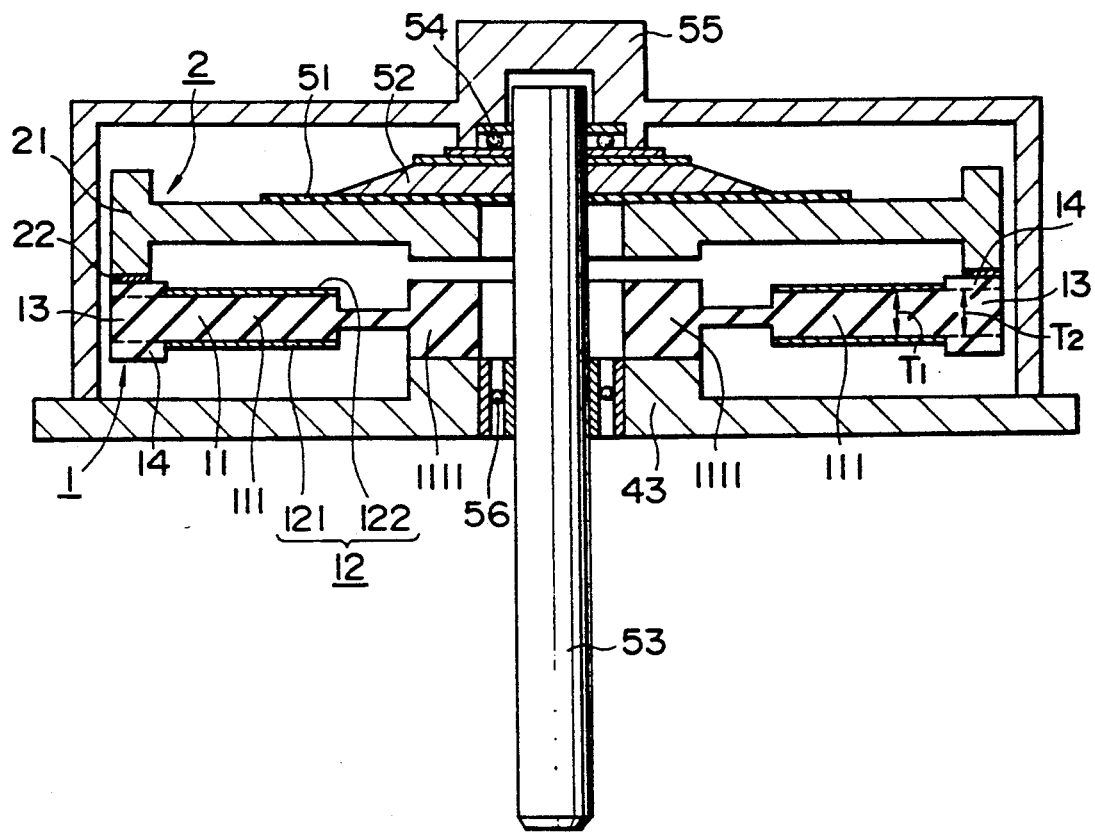
FIG. 1 is a sectional view of an ultrasonic motor according to a first embodiment of the present invention.

The present invention is an ultrasonic motor comprising a vibrator 1 which has a disk-shaped elastic member 11 and a disk-shaped piezoelectric ceramic 12 attached to a surface of the elastic member 11 and a rotor 2 which is in press contact with a driving force transmitting portion 13 of the elastic member 11, wherein the elastic member 11 is clamped by two piezoelectric ceramics 121 and 122 and has a part where the thickness of the elastic member 11 at a portion 111 thereof which is clamped by the piezoelectric ceramics 121 and 122 is substantially equal to the thickness at the driving force transmitting portion 13. In addition, projections 14 are provided on both sides of the driving force transmitting portion 13 of the vibrator 1. If the thickness of the elastic member at the portion thereof which is clamped by the piezoelectric cermaics is larger or smaller than the thickness of the elastic member at the driving force transmitting portion, it is difficult to generate at the driving force transmitting portion the same vibration mode as at the portion clamped by the piezoelectric ceramics, so that the resonance point at the driving force transmitting portion lowers and the vibrational amplitude decreases. In a case where projections are provided only one side of the driving force transmitting portion 13 of the vibrator 1 or no projections are provided on either side, the balance of vibration transmission is no good, so that driving force derived from the vibration is not efficiently transmitted to the rotor.

To realize a state where the elastic member 11 is substantially uniform in thickness at the portion 111 which is clamped by the piezoelectric ceramics 121 and 122 and at the driving force transmitting portion 13, it is preferable to set $T_1/T_2$ within the range of from 0.8 to 1.3, where $T_1$ is the thickness of the portion 111 clamped by the piezoelectric ceramics 121 and 122, and $T_2$ the thickness of the driving force transmitting portion 13. If $T_1/T_2$ is less than 0.8 or more than 1.3, it is difficult to generate at the driving force transmitting portion 13 the same vibration mode as at the portion 111 clamped by the piezoelectric ceramics, so that the resonance point at the driving force transmitting portion 13 lowers and the vibrational amplitude decreases.

The part of the elastic member where the thickness of the elastic member at the portion clamped by the piezoelectric ceramics is substantially equal to the thickness at the driving force transmitting portion need not necessarily be substantially uniform with other part in thickness. For example, projections 14 are provided to achieve an increase in the vibrational amplitude by adding mass to the elastic member at the driving force transmitting portion, the projections 14 being provided on both sides of the vibrator. Regarding the area proportion of the part of the elastic member where the thickness of the elastic member at the portion clamped by the piezoelectric ceramics is substantially equal to the thickness at the driving force transmitting portion, if it is assumed that the disk-shaped portion of the elastic member that is clamped by the piezoelectric ceramics has an inner diameter of 45 mm and an outer diameter of 60 mm, the portion of the elastic member at the driving force transmitting portion that is substantially equal in thickness with the piezoelectric ceramic-clamped portion is preferably 0.5 to 1.0 times the area of the piezoelectric ceramic-clampled portion. Under the above-described conditions, it is preferable to set the inner diameter of the driving force transmitting portion at 60 mm and the outer diameter within the range of from 60 to 70 mm.

If the area (dimension) proportion is out of the above-described range, spurious vibration other than bending vibration is generated at the driving force transmitting portion, so that the desired mode of vibration is distorted, resulting in a small vibrational amplitude.

In addition, the proportion of the area of the region in the driving force transmitting portion where projections are provided to the area of the region where no projections are provided is preferably set at less than 50% for the same reason as the above.

The elastic member may be circular or elliptical as long as the configuration thereof forms a loop. The elastic member may have an annular configuration with a hole in the center for passing a shaft or the like.

In addition, the elastic member preferably has a cross-section which is symmetrical with respect to the center line. For example, in the case of a circular elastic member, it is preferable that the cross-section should be symmetrical with respect to both the axial center line and the diameterical center line. With such a configuration, the bending vibration of the piezoelectric ceramics can be performed readily and in a balanced state. In addition, it is preferable in order to achieve an increase in the vibrational amplitude to provide radial projections on the driving force transmitting portion at equal spacings and in symmetry. In other words, it is possible to utilize added mass for further increasing the vibrational amplitude.

As a material for the elastic member, it is preferable to employ a metal, for example, aluminum, stainless steel, etc., or ceramics, which have a small vibration loss and are free from fatigue failure. As a material for the piezoelectric ceramics, it is preferable to employ ceramics, e.g., PZT [$Pb(Zr,Ti)O_3$], or a polymer, e.g., PVDF (polyvinylidene difluoride), which has a large piezoelectric constant (d-constant) and a high quality factor Q.

Figure 23:
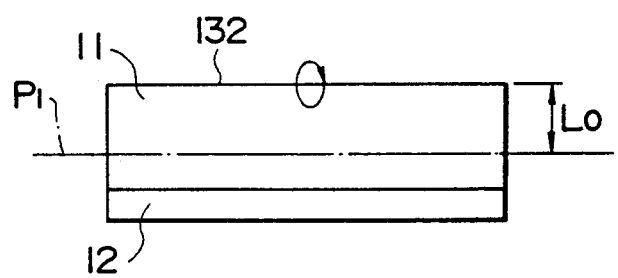
FIG. 23 is a conceptual view showing the motion of a vibratory wave in a driving force transmitting portion of a vibrator in an ultrasonic motor.
Figure 24:
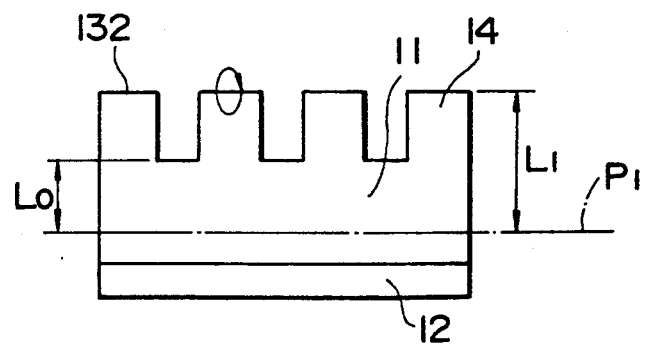
FIG. 24 is a conceptual view showing the motion of a vibratory wave in a driving force transmitting portion of a vibrator in an ultrasonic motor.

The driving force transmitting portion of the vibrator is provided with circumferentially spaced radial projections for achieving an increase in the vibrational amplitude. The projections are in contact with the rotor so that rotational driving force derived from the vibration is transmitted from the vibrator to the rotor through the projections. The projections are effective to increase the distance from the neutral plane of bending vibration (hereinafter referred to as simply "neutral plane") $P_1$ to the end 132 of the driving force transmitting portion, as will be clear from FIG. 24. More specifically, in the case of an elastic member with no projections, as shown in FIG. 23, the distance from the neutral plane $P_1$ to the end 132 of the driving force transmitting portion is $L_0$, whereas, in the case of the elastic member with the projections 14 shown in FIG. 24, although the neutral plane $P_1$ is somewhat raised, the distance $L_1$ from the neutral plane $P_1$ to the end 132 of the driving force transmitting portion is larger than $L_0$, so that the vibrational amplitude is enlarged.

However, in the conventional ultrasonic motor the radial length of projections which are interposed between the vibrator and the rotor is about one quarter of the wavelength of the vibratory wave generated. Because of this large radial length of the projections, the vibratory wave with a large amplitude at the outer peripheral side of the projections is undesirably absorbed by the unnecessary added mass which is present at the inner peripheral side. Accordingly, it is difficult to transmit the rotational driving force derived from the vibration to the rotor and the vibrational amplitude is undesirably held down to a relatively low level.

Accordingly, noting the radial length of the projections of the ultrasonic motor, the present inventors have found that the vibrational amplitude is the largest at the outer peripheral surface of the driving force transmitting portion and decreases as the distance therefrom increases radially inward.

Thus, in order to enable rotational driving force derived from the vibration with a large vibrational amplitude to be efficiently transmitted from the vibrator to the rotor, the driving force transmitting portion of the vibrator is preferably arranged such that it contacts the rotor through projections which are provided to extend radially from the outer peripheral surface of the vibrator through a distance which is not longer than one eighth of the wavelength of the vibratory wave generated.

At the driving force transmitting portion of the ultrasonic motor, the vibrational amplitude is the largest at the outer peripheral surface of the driving force transmitting portion and decreases as the distance therefrom increases radially inward. However, since the length of the projections provided at the outer peripheral surface of the vibrator is not longer than one eighth of the wavelength of the vibratory wave generated, the projections are present at a position where the vibrational amplitude is the largest, and no projections are present at a position where the vibrational amplitude is small. Accordingly, rotational driving force derived from the vibration with a large amplitude is transmitted to the rotor through the projections. Further, since no unnecessary added mass is present at the inner peripheral surface of the vibrator, vibrations with a large amplitude can be generated efficiently. In addition, since there is only a slight possibility of a difference being produced in the level of torque transmitted to the rotor between the outer and inner peripheral surfaces of the vibrator, the rotor rotates efficiently.

Thus, rotational driving force derived from the vibration with a large vibrational amplitude can be efficiently transmitted from the vibrator to the rotor.

Figure 18:
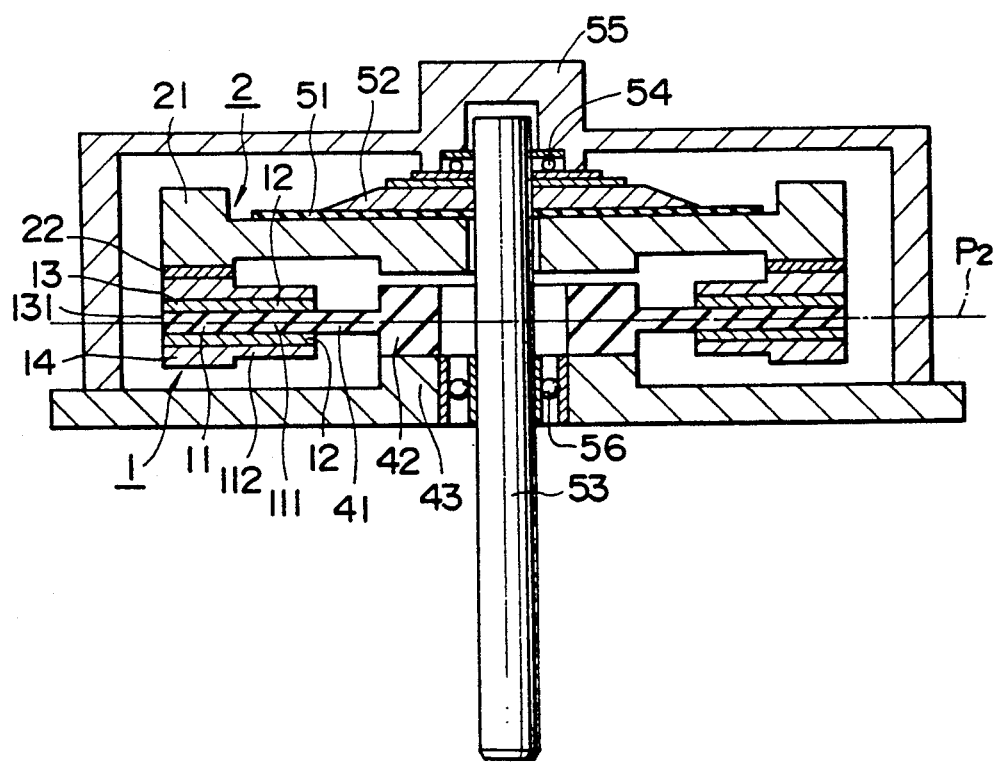
FIG. 18 is a sectional view of an ultrasonic motor according to one embodiment of the present invention.
Figure 19:
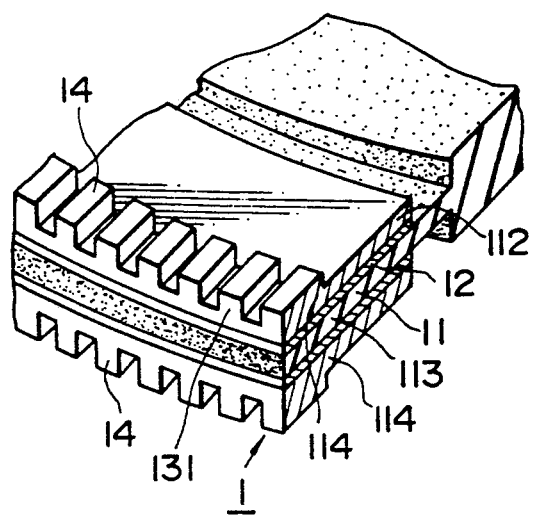
FIG. 19 is a partly-sectioned perspective view of a vibration transmitting portion of a vibrator in the ultrasonic motor shown in FIG. 18.

The above-described arrangement will be explained below in more detail. Referring to FIGS. 18 and 19, the ultrasonic motor comprises a vibrator 1 which has a disk-shaped elastic member 11 and a disk-shaped piezoelectric ceramic 12 attached to a surface of the elastic member 11 and a rotor 2 which is in press contact with a driving force transmitting portion 13 of the elastic member 11, wherein the driving force transmitting portion 13 is provided with projections 14, which extend radially from the outer peripheral surface 131 through a distance which is not longer than one eighth of the wavelength of the vibratory wave generated, so that the driving force transmitting portion 13 and the rotor 2 are in press contact with each other through the projections 14.

The size of the amplitude of the vibratory wave generated changes along the curve shown in FIG. 25 (in which λ represents the wavelength of the vibratory wave; the same is the case with the following figures), that is, the amplitude is the largest at the outer peripheral surface 131 of the driving force transmitting portion 13 of the vibrator 1 and decreases radially inward. In the above-described arrangement, projections are present only in a portion where the amplitude is relatively large, but no added mass is present at the inner peripheral side; therefore, the rotational driving force derived from the vibration can be efficiently transmitted to the rotor.

This will be explained below in more detail. As shown in FIGS. 26(a) to 26(d), the vibration mode of the vibrator is such that the vibrational amplitude is constantly changed in the outer circumferential direction and the position of the node of vibration is not fixed. In the radial direction, on the other hand, the vibrational amplitude is the largest at the outermost peripheral surface and decreases toward the inner side. With regard to the relationship of the vibration of the vibrator to the wavelength, portions where the vibrational amplitude is relatively large concentrate on a region which extends radially from the outermost peripheral surface to an eighth-wavelength (λ) position, as shown in FIG. 26. It should be noted that FIG. 26 shows the vibration mode and vibration distribution of the vibrator, in which FIG. 26(a) shows the vibration mode of the vibrator, FIG. 26(b) shows the state of the vibrational amplitude in the circumferential direction of the vibrator, FIG. 26(c) shows the vibrational amplitude distribution in the radial direction of the vibrator, and FIG. 26(d) is an enlarged view of a part of FIG. 26(c).

It should be noted that the projections may be provided at any position on the vibrator as long as it is within a range that extends radially from the outermost peripheral surface through a distance which is not longer than one eighth of the wavelength.

Figure 29:
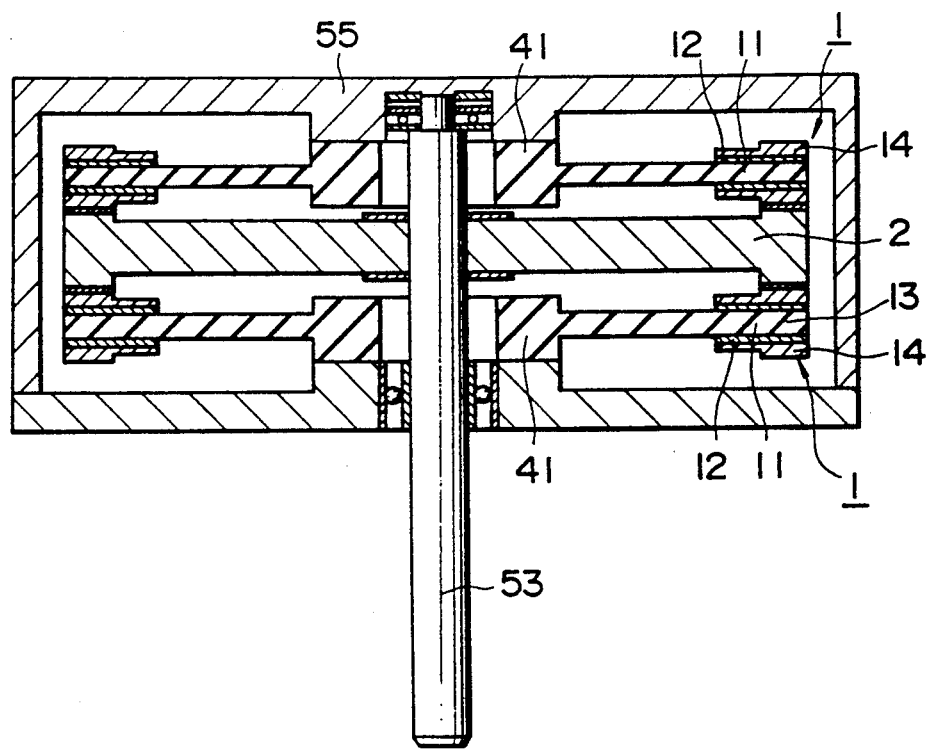
FIG. 29 is a sectional view of an ultrasonic motor according to one embodiment of the present invention.

The elastic member may have either an integral structure, as shown in FIG. 29, or a structure that comprises upper, inner and lower elastic member portions and two piezoelectric ceramics which are clamped respectively between the upper and inner elastic member portions and between the inner and lower elastic member portions, as shown in FIG. 19.

Further, the ultrasonic motor preferably has a vibrator structure in which the bending vibration has a primary mode in the radial direction and an n-order mode (n: number of waves) in the circumferential direction. In a case where a single piezoelectric ceramic is employed, an increase in the distance between the piezoelectric ceramic and the neutral plane of the vibrator that is caused by provision of the projections on the vibrator results in an increase in the allowable liminal distortion factor of the piezoelectric ceramic, so that the lifetime of the piezoelectric ceramic may be shortened. In contrast, in the structure where the elastic member is clamped by two or more piezoelectric ceramics, the neutral plane of the vibrator constantly lies on the diametrical central line of the vibrator without a change. Accordingly, there is no possibility that the distance between each piezoelectric ceramic and the neutral plane of the vibrator may increase, and hence the structure of the present invention is free from the above-described problem. Moreover, it is possible to increase the vibrational amplitude by providing the projections on the vibrator. Thus, it is preferable to employ the structure wherein the elastic member is clamped by two or more piezoelectric ceramics.

Figure 20:
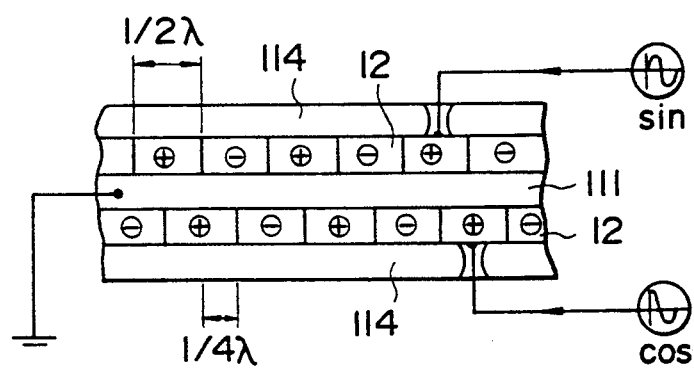
FIG. 20 is a plan view of a portion of the vibrator to which piezoelectric ceramics are bonded in the ultrasonic motor shown in FIG. 18.

The piezoelectric ceramic comprises an annular piezoelectric ceramic which is equally divided into sections each defined by the half-wavelength. In a case where the elastic member is clamped by two or more piezoelectric ceramics, two piezoelectric ceramics, each having being subjected to polarization process to provide transverse piezoelectric effects which are alternately different in directivity, are disposed to be spatially offset from each other by the quarter-wavelength, as shown in FIG. 20, thereby allowing the vibrations of the two piezoelectric ceramics to interact with each other, and thus generating a vibratory wave in the vibrator.

The piezoelectric ceramics may be circular or elliptical as long as the configuration thereof forms a loop. The piezoelectric ceramics may have an annular configuration with a hole in the center for passing a shaft or the like, or a configuration without any hole. The piezoelectric ceramics may be attached to any position of the elastic member. In the case of a circular vibrator, for example, a piezoelectric ceramic may be attached to either of the inner or outer peripheral surfaces of the driving force transmitting portion 13, as shown in FIG. 29. It is also possible to employ a structure in which the elastic member 11 comprises an inner elastic member portion 113 which is clamped by two piezoelectric ceramics 12, and a pair of upper and lower elastic member portions 114 which clamp the inner elastic member portion 113 thus clamped, as shown in FIG. 19. It shold be noted that the thickness of the inner portion 113 of the elastic member 11 at the portion to which the piezoelectric ceramics 12 are attached is equal to the thickness at the driving force transmitting portion. It should be also noted that when two or more piezoelectric ceramics are employed, these are disposed to clamp the elastic member at the same position. In addition, a plurality of piezoelectric ceramics may be stacked when attached to the elastic member.

Figure 21:
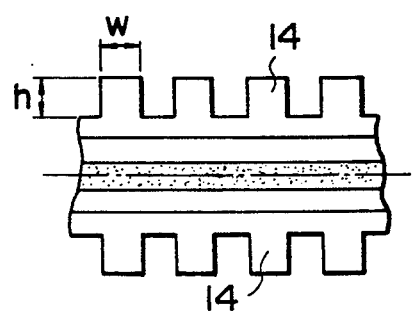
FIG. 21 is a plan view of the outer peripheral surface of the vibration transmitting portion of the vibrator in the ultrasonic motor shown in FIG. 18.

In a case where a driving force transmitting portion is provided around the outer peripheral portion of the vibrator and slit at equal spacings to provide the above-described projections locally, as shown in FIG. 21, the relationship between the circumferential length w and axial height h of each projection 14, i.e., h/w, is preferably within the range of from 0.5 to 10. It is preferable in order to increase the vibrational amplitude to increase the axial height h of the projections 14. However, as the elasticity limit of the annular elastic member becomes limited, the loss due to mechanical vibration increases and problems such as heat generation and destruction arise; therefore, the increase of the axial height h of the projections 14 is allowed only within a certain limited range. To obtain a motor of low speed and high torque, it is preferable to reduce the height h and increase the length w. By increasing the width w at the sacrifice of the height h, the frictional surface of the rotor can be increased.

It is preferable to employ an elastic material for the projections. When an elastic material is employed, it may be similar to a material for the elastic member of the vibrator. However, in a case where the elastic member comprises an inner and pair of upper and lower elastic member portions, a material which is different from that for the elastic member may be employed by taking into consideration the rub and wear resistance characteristics of the upper and lower elastic member portions.

If the vibrator is formed by use of a working method such as pressing process, excellent mass-productivity is obtained.

Figure 27A:
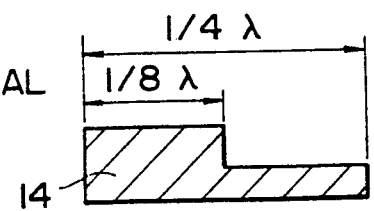
FIG. 27(a) is a sectional view.
Figure 27B:
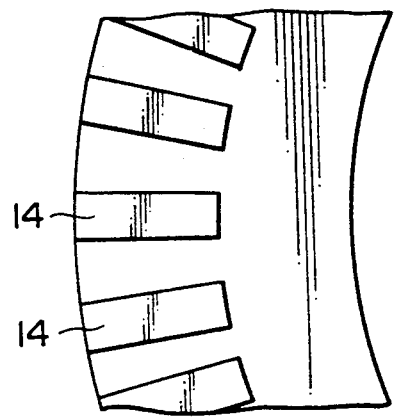
FIG. 27(b) is a plan view.
Figure 28A:
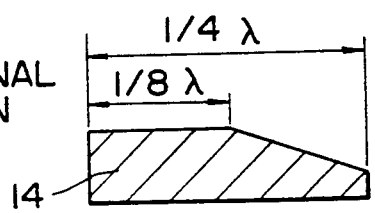
FIG. 28(a) is a sectional view, and FIG. 28 (b) is a plan view, FIGS. 27 and 28 showing projections only on one side of the driving force transmitting portion for simplicity of illustration.
Figure 28B:
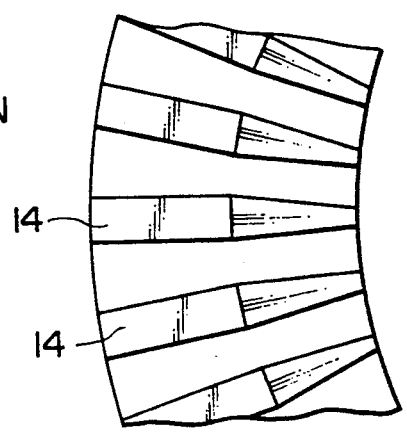

Portions other than the projections 14 in the driving force transmitting portion may be flat, as shown in FIGS. 27(a) and 27(b), or slanted, as shown in FIGS. 28(a) and 28(b).

To allow bending vibration of the vibrator to be generated uniformly over a plane perpendicular to the axial center axis, the vibrator is preferably supported at a position which is remote from the portion where piezoelectric ceramics are disposed in order to prevent transmission of unnecessary vibration to the vibrator. In addition, in order to realize a large amplitude for a heavy load, the vibrator is preferably supported at a position which is provided on the neutral axis where the loss of the bending vibration generated from the piezoelectric ceramics is small.

To allow the elastic member 11 to generate bending vibration uniformly over a plane perpendicular to the axial center axis, the vibrator is preferably supported by a support member 43 at a position which is remote from the portion 111 where piezoelectric ceramics are disposed in order to prevent transmission of unnecessary vibration to the elastic member 11, as shown in FIG. 1.

The rotor 2 has a lining face that is in press contact with the driving force transmitting portion 13. In a case where the rotor 2 is brought into press contact with the upper side of the elastic member 11, it is preferable from the viewpoint of the structural balance to bring the rotor 2 into press contact with an annular surface of the elastic member 11 at the surface thereof which is opposed to the side thereof which faces the support member 43 with respect to the diametrical center axis.

Since the driving force transmitting portion 13 is present on both the upper and lower sides of the elastic member 11, the rotor 2 may be brought into press contact with both the upper and lower sides of the driving force transmitting portion 13 at the same time. The rotor 2 may also be brought into press contact with the annular surface of the elastic member 11 which faces the support member 43. In the case where the rotor 2 is brought into press contact with the both sides of the driving force transmitting portion 13 at the same time, it is possible to make distance for vibration transmission from piezoelectric ceramics equal and double the area of vibration contact, which results in effective transmission of vebration.

Figure 15:
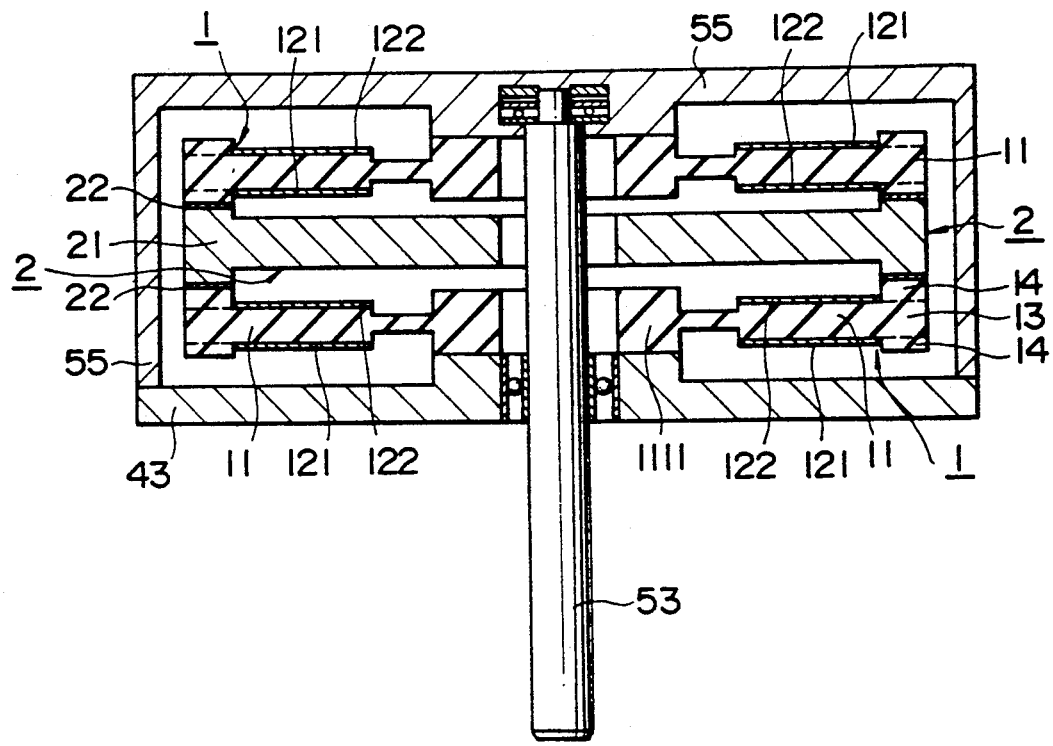
FIG. 15 is a sectional view of an ultrasonic motor according to a second embodiment of the present invention.
Figure 41:
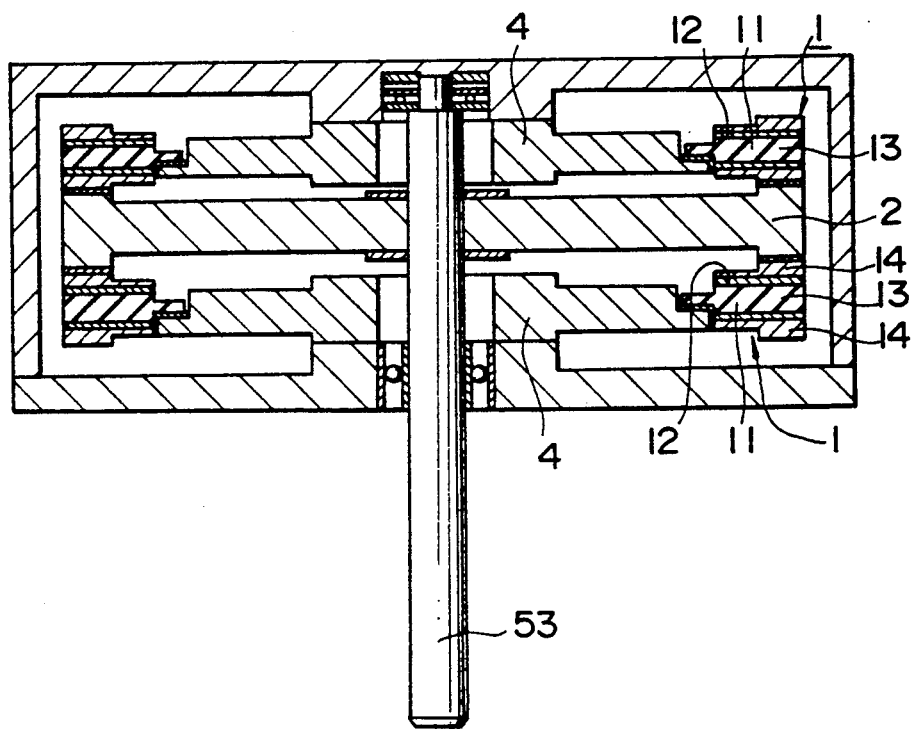
FIG. 41 is a sectional view of an ultrasonic motor according to one specific example of the present invention.

In addition, it is also possible to provide two elastic member (vibrator) structures, each comprising an elastic member 11 with two piezoelectric ceramics 121 and 122 attached to both sides, respectively, and bring simultaneously these two structures into press contact with both the upper and lower sides of the rotor 2, as shown in FIGS. 15, 29 and 41. By virtue of this arrangement, the drive source is doubled, so that a torque which is double the torque in the arrangement shown in FIG. 1 can be obtained for the rotor 2.

Takeout of the output from an ultrasonic motor is performed on the basis of efficient execution of the energy conversion and transfer process. More specifically, when electric energy is applied to a piezoelectric ceramic, vibrational energy is generated in a vibrator. The vibrational energy gives kinetic energy to a rotor through frictional force, so that the energy is obtained as the output of the motor.

Therefore, it may be considered to increase the frictional force occurring between the vibrator and the rotor and minimize the slip therebetween as a means for improving the motor output. For example, there has heretofore been a means to increase the frictional force by increasing the force with which the rotor is pressed against the vibrator to thereby increase the area of contact between the vibrator and the rotor. In this case, however, the slip between the vibrator and the rotor increases at the same time. With such a means, therefore, the motor output that can be obtained is limited to a relatively low level.

There have also been proposed a means of increasing the vibrational amplitude by increasing the height of projectioons provided at the driving force transmitting portion of the vibrator and a means of increasing the spacing between each pair of adjacent projections in order to minimize the slip between the vibrator and the rotor.

With the above-described means, a certain (several %) improvement in the motor output can be obtained, but it is impossible to obtain a high output which is adequate for automotive functional parts or the like.

Accordingly, it is preferable in order to output a high torque to clamp the driving force transmitting portion of the above-described vibrator by at least two rotors.

In the above-described arrangement, when a high frequency voltage is applied to the piezoelectric ceramics of the vibrator, a progressive wave is formed in the vibrator. Since the driving force transmitting portion is clamped and pressed by the rotors, deformation of the vibrator can be suppressed and, at the same time, force that acts in one direction is generated in the rotors by the progressive wave. The two actions, that is, the suppression of deformation of the vibrator and the increase in the area of the frictional surfaces, interrelate with each other to increase the frictional force, so that the driving force generated in the rotors also increases and the slip decreases.

Since the frictional surface area becomes double that in the prior art motor, the rate at which the surface roughness affects increases and hence the force that drives the rotor unit increases. Accordingly, the friction factor apparently increases, so that it is possible to obtain adequate frictional force even if the pressure applied to the vibrator is reduced.

Thus, the above-described arrangement enables an increase in the frictional force and a reduction in the slip by suppressing the deformation of the vibrator and the rotor unit due to the applied pressure and increasing the frictional surface area in comparison to the prior art motor. It is therefore possible to generate driving force of high torque.

Figure 49:
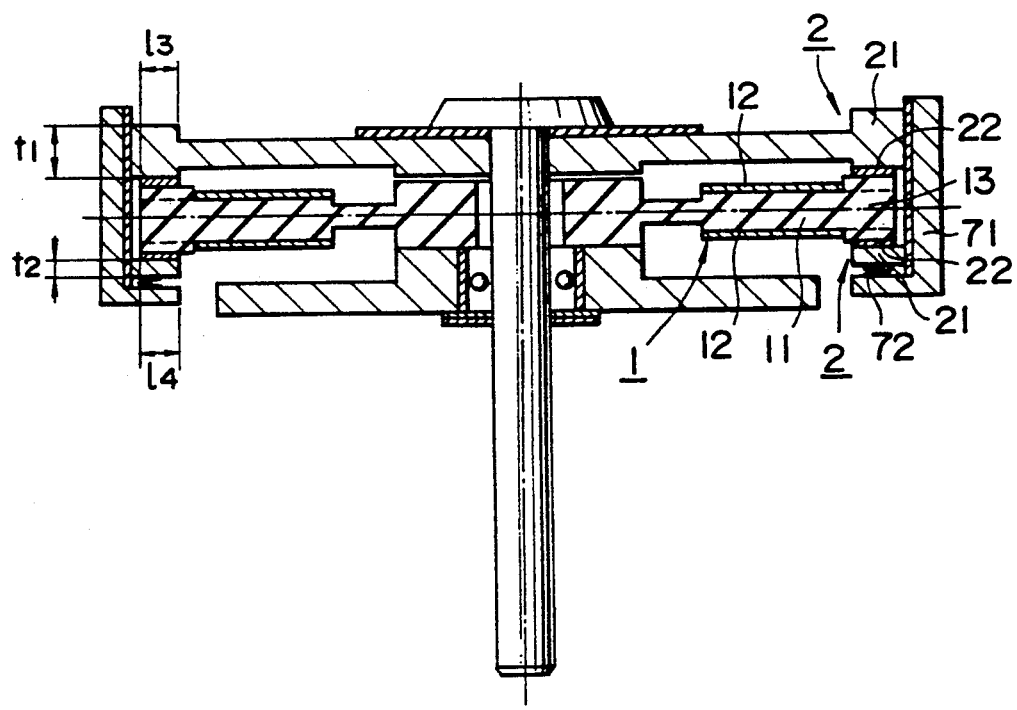
FIG. 49 is a sectional view of an ultrasonic motor according to one specific example of the present invention.

The above-described arrangement will be explained below in more detail. That is, a single vibrator is provided with a driving force transmitting portion on each of the upper and lower sides thereof, and at least two rotors are brought into press contact with this vibrator in such a manner that the driving force transmitting portion is clamped by the rotors at both the upper and lower sides thereof. More specifically, the driving force transmitting portion 13 of the vibrator 1 is clamped by at least two rotors 2, as shown in FIG. 49. With this arrangement, the two actions, that is, the suppression of deformation of the vibrator and the increase in the area of the frictional surfaces, interrelate with each other to increase the frictional force and reduce the slip, thereby enabling driving force of high torque to be generated in the rotor unit.

Figure 50:
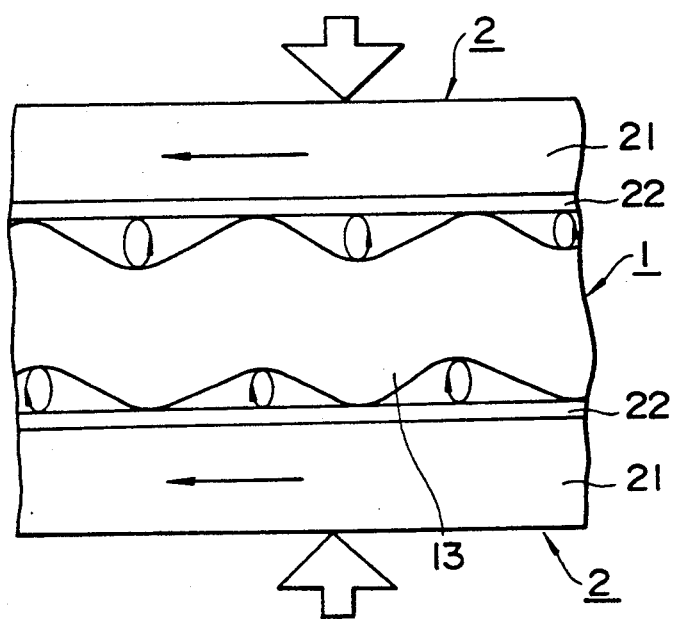
FIG. 50 is a conceptual view showing the principle of generation of a progressive wave in the ultrasonic motor according to the present invention.
Figure 51:
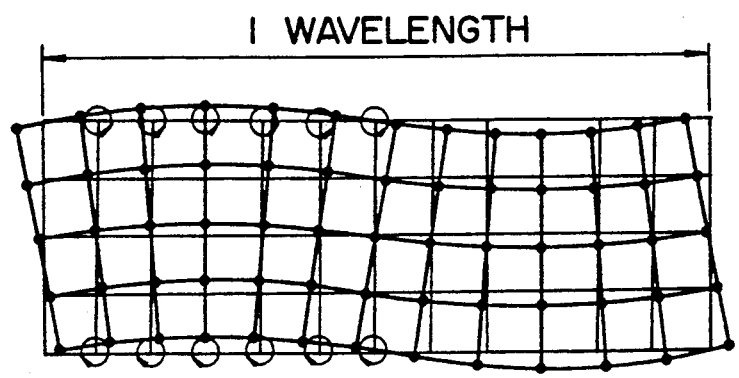
FIG. 51 is a diagram showing the condition of vibrational amplitude through one wavelength in a section of the side of the vibrator in the ultrasonic motor of the present invention.

FIG. 50 shows the principle of generation of a progressive wave in the above-described structure, and FIG. 51 shows the condition of the vibrational amplitude in one wavelength in a section of the side of the vibrator. When electric energy is applied to the piezo-electric ceramics of the vibrator 1, the driving force transmitting portion 13 of the vibrator 1 is deflected by the bending vibration, thus generating a flexural wave. Thus, the vibrator 1 performs bending motion in such a manner that, when the upper side of the vibrator 1 expands, the lower side contracts, thus propagating the wave circumferentially. Hence, each point mass moves on an elliptical locus. Accordingly, the rotors 2 which are in contact with the driving force transmitting portion 13 move (leftwardly as viewed in FIG. 50) through frictional force which acts counter to the above-described motion on an elliptical locus. The rotors 2 are preferably placed under pressure in order to obtain the above-described driving force (the downward and upward arrows in FIG. 50 represent applied pressures). In addition, the upper and lower rotors are preferably placed in contact with the upper and lower sides, respectively, of the driving force transmitting portion under the same level of pressure in order to allow these rotors to receive driving force uniformly. For this purpose, it is preferably to provide a pressure application means having a spring action for each of the upper and lower rotors.

The following are examples of the form of bringing rotors into press contact with the driving force transmitting portion of the vibrator, as described above.

Figure 52:
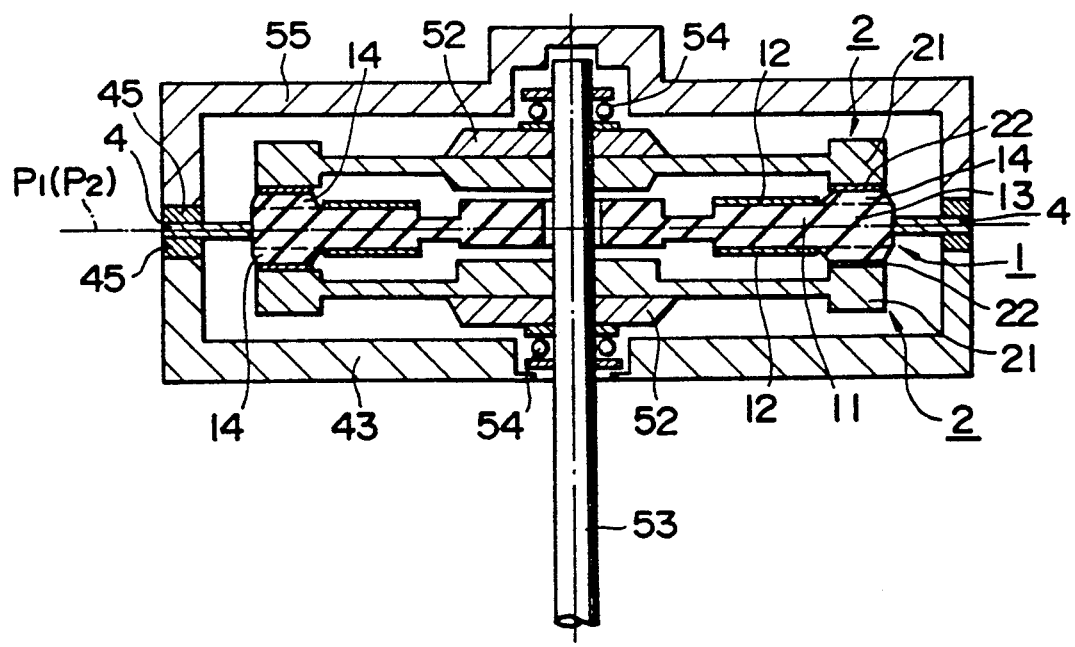
FIG. 52 is a sectional view of an ultrasonic motor according to one embodiment of the present invention.

Referring to FIG. 52, a support portion 4 of the vibrator 1 is provided around the outer peripheral portion of the vibrator 1, and the upper and lower rotors 2 are pressed by respective dish springs 52 and connected to a shaft 53 for taking out torque. In the prior art arrangement wherein a rotor is pressed from one direction so as to be brought into press contact with the vibrator, a pressure which is substantially equal to the vibrational force of the vibrator is needed, whereas, in this arrangement, the required pressure is about half that in the prior art. Thus, the applied pressure need not be increased, and it is only necessary to apply a relatively light load.

Figure 53:
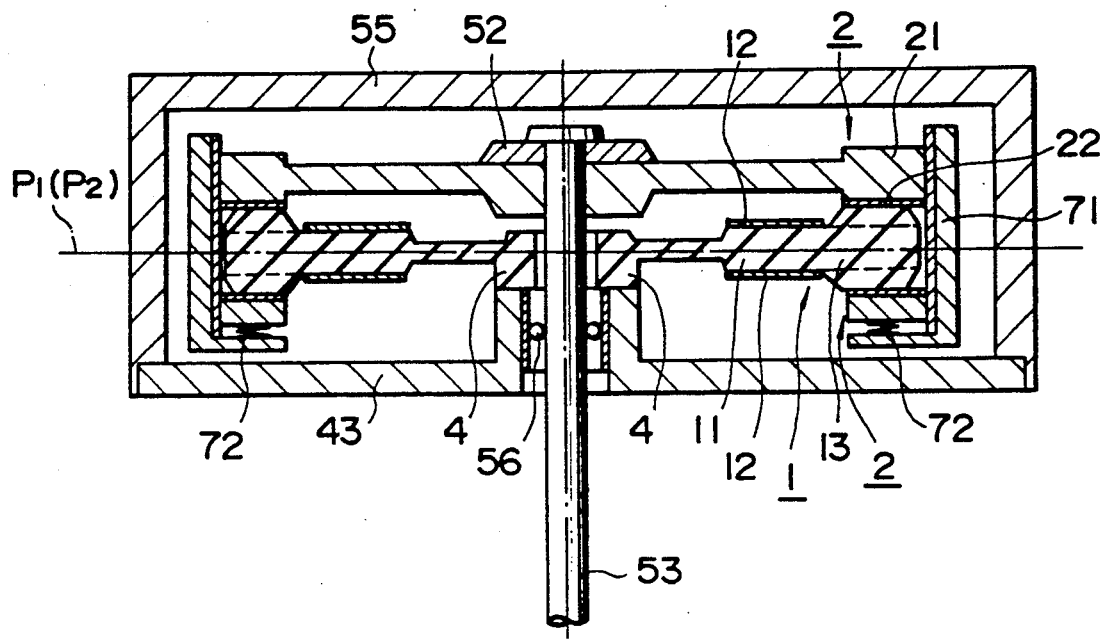
FIG. 53 is a sectional view of an ultrasonic motor according to one embodiment of the present invention.
Figure 54:
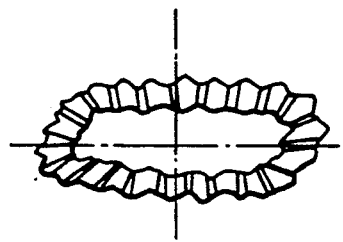
FIG. 54 is a perspective view of a corrugated ring spring used in an ultrasonic motor according to one specific example of the present invention.
Figure 55:
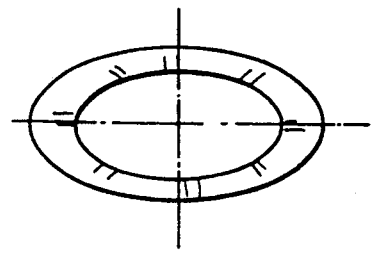
FIG. 55 is a perspective view of a ring spring used in an ultrasonic motor according to one specific example of the present invention.
Figure 59:
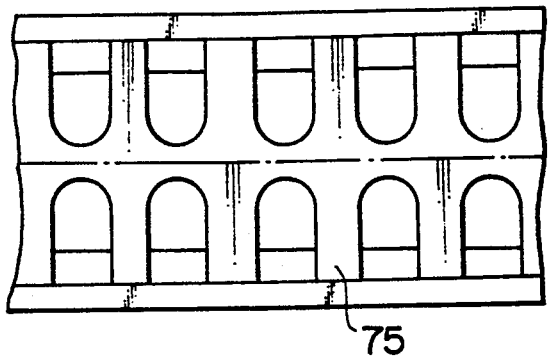
FIG. 59 is a plan view of the contact area shown in FIG. 58, seen from the direction of the arrow X.
Figure 60:
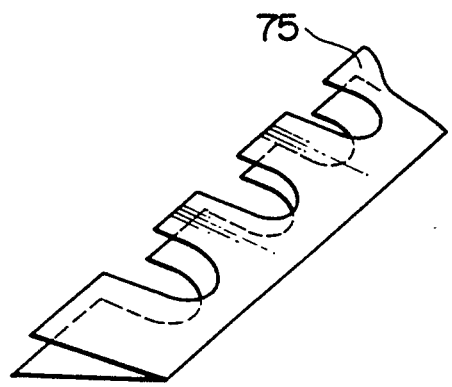
FIG. 60 is a perspective view of a connecting spring used for the contact area shown in FIG. 58.
Figure 61:
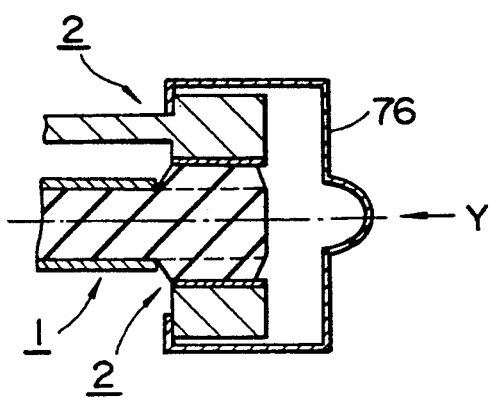
FIG. 61 is a sectional view of an area of contact between a vibrator and rotor of an ultrasonic motor according to one specific example of the present invention.
Figure 62:
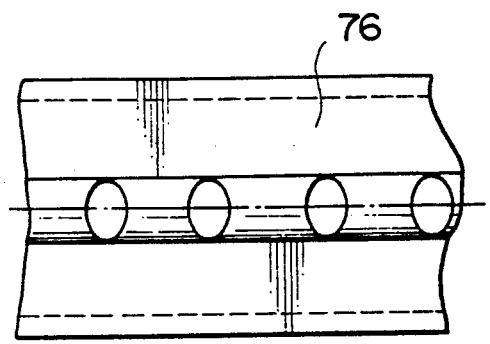
FIG. 62 is a plan view of the contact area shown in FIG. 61, seen from the direction of the arrow Y.
Figure 63:
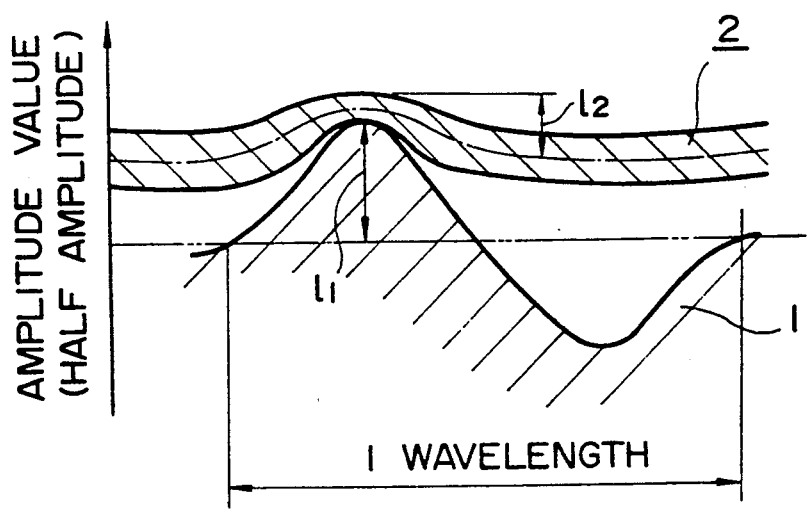
FIG. 63 is a conceptual view showing the amplitude of a progressive wave at an area of contact between a vibrator and rotor of an ultrasonic motor according to one specific example of the present invention.

In the arrangement shown in FIG. 53, a support portion 4 of the vibrator 1 is provided near the center thereof, and upper and lower rotors 2 are connected (e.g., by means of screws or bonding) through a rotor guide 71 made, for example, of a plastic material. The upper rotor 2 is pressed by use of a dish spring 52, whereas the lower rotor 2 is pressed by use of a ring spring 72, and the upper rotor 2 is connected to a shaft 53 for taking out torque. Examples of the ring spring 72 include a corrugated ring spring such as that shown in FIG. 54 and a ring spring such as that shown in FIG. 55. Examples of the form of pressing the lower rotor against the driving force transmitting portion of the vibrator include: the form in which the upper and lower rotors 2 are connected by a combination of a connecting bar 73 and a coil spring 74, as shown in FIG. 56; the form in which the upper and lower rotors 2 are connected by a coil spring 74 only, as shown in FIG. 57; the form in which ring-shaped or split sectorial connecting springs 75 are provided on the upper and lower rotors 2 at respective positions which are equally spaced circumferentially, as shown in FIGS. 58, 59 and 60; and the form in which ring-shaped or split sectorial connecting fasteners 76 are provided on the upper and lower rotors 2 at respective positions which are equally spaced circumferentially, as shown in FIGS. 61 and 62. The above-described structure in which the upper and lower rotors are connected through a spring mechanism enables driving force to be uniformly transmitted to the two rotors because, when the upper side of the vibrator expands, the lower side contracts, as shown in FIG. 50.

Although the configuration of the vibrator can be determined by setting a target resonance frequency, it is extremely difficult to generalize the configuration of the rotor because various kinds of technical factor determine a rotor configuration which is the most suitable for each particular occasion. However, an ideal rotor is preferably configured such that the vibrational amplitude value $l_1$ that is received by the rotor 2 is within the range of from about $\frac{1}{2}$ to about $\frac{1}{4}$ of the amplitude value (half amplitude) $l_2$ of the vibrator 1. By so doing, the rotor 2 follows the flexural wave generated in the vibrator 1 to receive locomotive power, which is output as torque. In actual practice, a friction material is provided on a portion of the rotor that is in contact with the vibrator. In many cases, the friction material is different from the material used for the rotor body. With the friction material regarded as a sound absorbing material, it is preferable to employ for the rotor a material which is higher in Young's modulus, smaller in density and higher in sound velocity than the vibrator, for example, an aluminum alloy.

Two or more rotors employed are preferably uniform with each other in the area of contact between the same and the driving force transmitting portion of the vibrator. More specifically, the radial lengths $l_3$ and $l_4$ of the two rotors 2 shown in FIG. 49 which are in contact with the driving force transmitting portion 13 are preferably equal to each other. It is also preferable that the axial thicknesses ($t_1$ and $t_2$ in FIG. 49) of the respective portions of the two rotors 2 which are in contact with the driving force transmitting portion 13 of the vibrator 1 should be equal to each other. With this form, the resonance vibration systems of the upper and lower rotors are equal to each other, so that driving force can be efficiently generated in the rotors.

In the ultrasonic motor, the vibrator that comprises an elastic member and piezoelectric ceramics attached thereto is supported by a support member so that the vibrator itself is prevented from moving. The following are hitherto proposed connecting structures for the vibrator and the support member, which are designed so that, when the vibrator induces a torque in the rotor by vibrations, unnecessary vibration can hardly be generated in and propagated to the support member.

Figure 39:
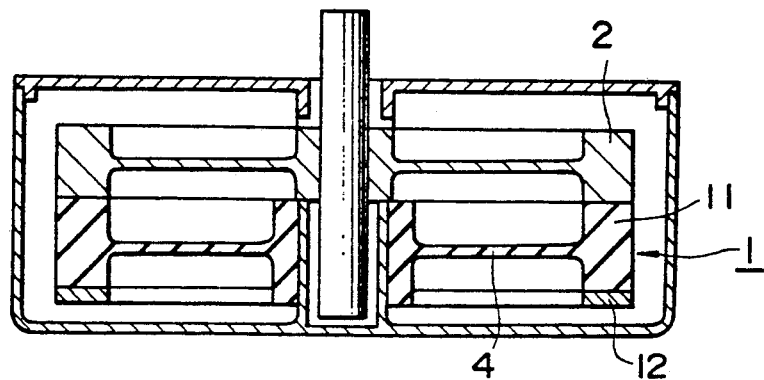
FIG. 39 is a sectional view of a conventional ultrasonic motor.

Referring to FIG. 39, a support member 4 that supports a vibrator 1 and a rotor 2 is formed with an elastically deformable thin disk-shaped structure to provide an integral structure, thereby preventing the propagation of unnecessary vibration to the support member 4 (see Japanese Patent Application Laid-Open (KOKAI) No. 62-77068). With this arrangement, however, when a torque is induced in the rotor 2 by the vibration of the vibrator 1, the vibrator 1 causes bending vibration at the outer peripheral portion and hence has a larger deformation than the rotor 2, so that the friction contact between the vibrator 1 and the rotor 2 becomes nonuniform and the number of contact portions decreases, resulting in unstable rotational drive. In addition, since the vibrator has an integral structure, unnecessary vibration is readily generated in the vibrator 1 and such vibration is propagated directly to the support member 4, so that audible sound is undesirably generated when a torque is induced in the rotor by the vibration of the vibrator 1. Similarly, the propagation of unnecessary vibration to the support member cannot completely be cut off by a structure in which the vibrator and the support member are simply bonded or combined together. In addition, when a high torque is to be obtained, a high pressure is applied to the rotor. In such a case, since the rotor and the outer peripheral portion of the vibrator are integral with each other, the vibration of the vibrator causes even more unstable rotational drive due to the difference in the amount of deformation owing to the difference in rigidity.

Figure 40:
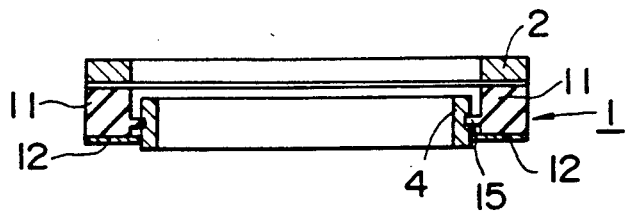
FIG. 40 is a sectional view of a conventional ultrasonic motor.

Other connecting structures for the vibrator and the support member, which have heretofore been proposed, include: a structure in which a vibrator 1 is provided with a flange portion 15 which is continuous therewith, and this flange portion 15 is clamped by a support member 4, thereby securing the vibrator 1, as shown in FIG. 40 (see Japanese Patent Application Laid-Open (KOKAI) No. 02-142370); a structure in which a vibrator is provided with a flange portion which is continuous circumferentially and which has a plurality of recesses or projections, and this flange portion is clamped by a support member provided on a rotor; a structure in which the above-described flange portion is made of a material which is different in the modulus of elasticity from the vibrator (see Japanese Patent Application Laid-Open (KOKAI) No. 02-133076); and a structure in which a vibrator is formed using a plurality of materials which are different from each other in the modulus of elasticity, and a portion of the vibrator which has a low modulus of elasticity is supported (see Japanese Patent Application Laid-Open (KOKAI) No. 02-142369).

In the above-described structure wherein a flange portion of an elastic member is clamped by a support member, the elastic member and the support member are locked in the connected state, which causes unnecessary vibration to be generated in the support member when a torque derived from the vibration is induced in the rotor, and since such unnecessary vibration is propagated to the support member, audible sound is undesirably generated when a torque derived from the vibration is induced in the rotor, in the same way as in Japanese Patent Application Laid-Open (KOKAI) No. 62-77068. In addition, in the structure wherein the vibrator is clamped, the portion of the vibrator that is connected to the support member is in multiplanar contact with it, so that unnecessary vibration is undesirably propagated.

Thus, since no satisfactory consideration has been given to the connecting structure for the vibrator and the support member, audible sound is undesirably generated when the vibrator induces a torque in the rotor by the vibration and it is difficult to stably generate rotation of high torque.

Accordingly, in order to rotate the rotor with a high torque without generating audible sound when the vibrator induces a torque in the rotor by the vibration, it is preferable that the vibrator and a support member should be connected through a polymer member made of a polymer compound with vibration-proof properties and that the vibrator should be free at the side thereof which is opposed from the surface that is in contact with the polymer member.

By virtue of the above-described arrangement, the vibrator and the support member are connected together in a state wherein the vibrator is not locked (i.e., in a free state) at the side thereof which is opposed to the surface that is in contact with the polymer member; therefore the vibrator can be deformed relatively freely even when it is under the pressure applied from the rotor. Accordingly, there is no generation of unnecessary vibration of the support member. In addition, since the vibrator and the support member are connected through a polymer member with vibration-proof properties, unnecessary vibration generated in the vibrator is absorbed in the polymer member, so that no unnecessary vibration is propagated to the support member. Accordingly, it is possible to prevent generation of vibration sound (audible sound) from the joint of the vibrator and the support member. In addition, it is possible to attain a high torque by efficient transmission of a torque, derived from the vibration of the vibrator, to the rotor.

Thus, the rotor can be rotated with a high torque without generating audible sound when a torque derived from the vibration of the vibrator is transmitted to the rotor.

Figure 37:
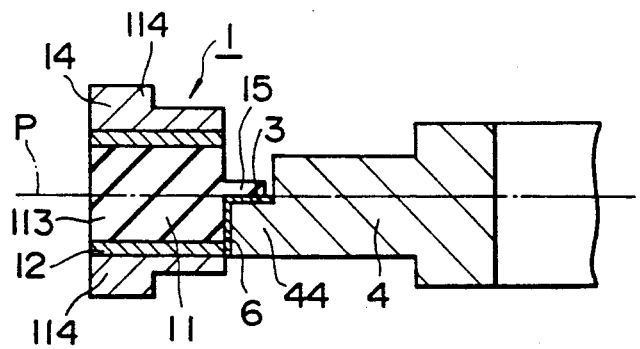
FIG. 37 is a fragmentary sectional view of a joint of the vibrator and a support member in the ultrasonic motor shown in FIG. 36.
Figure 38:
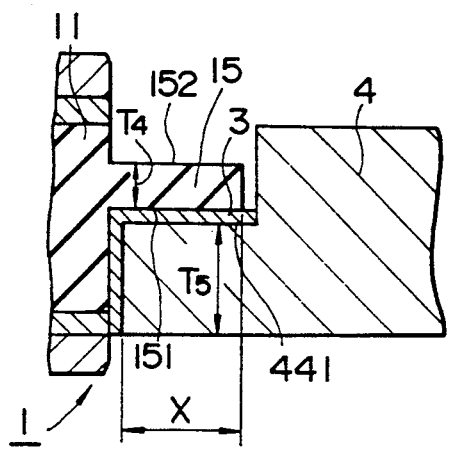
FIG. 38 is a fragmentary enlarged sectional view of the joint shown in FIG. 37.

The above-described arrangement will be explained below in more detail. In the arrangement, as shown in FIGS. 36, 37 and 38, a vibrator 1 and a support member 4 are connected through a polymer member 6 with vibration-proof properties, and the vibrator 1 has a connecting portion 15, which comprises a face 151 that is in contact with the polymer member 6 as at reference numeral 3 and a face 152 that is fromed at the side of the connecting portion 15 which is opposed to the face 151, the face 152 being contacted by no member or portion (i.e., in a free state).

Figure 36:
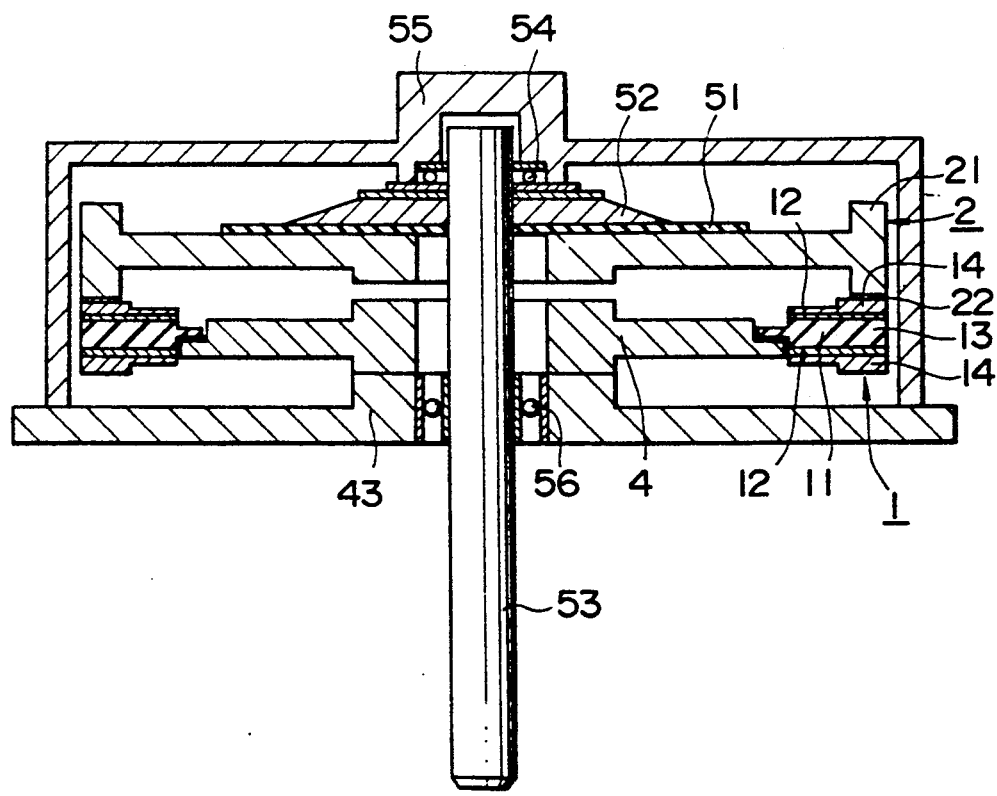
FIG. 36 is a sectional view of an ultrasonic motor according to one embodiment of the present invention.
Figure 42:
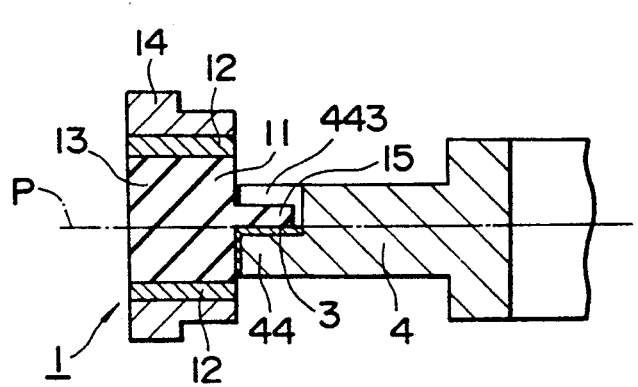
FIG. 42 is a sectional view of a joint of a vibrator and a support member in an ultrasonic motor according to one embodiment of the present invention.
Figure 43:
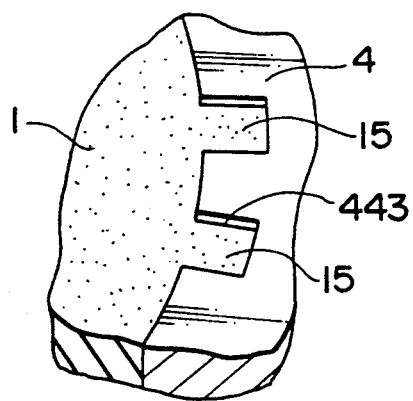
FIG. 43 is a partly-sectioned perspective view of the joint of the vibrator and the support member in the ultrasonic motor shown in FIG. 42.

Referring to FIG. 36, the support member 4 that supports the vibrator 1, which comprises an elastic member 11 and a piezoelectric ceramic 12, receives the pressure applied to the rotor 2 counter to the applied pressure so that the vibrator 1 will not be deformed. The support member 4 may have any configuration as long as it can support the vibrator 1. However, it is preferable for the support member 4 to have a flange portion 44, as shown in FIG. 37. Alternatively, it is preferable to provide the vibrator 1 with split flange portions (connecting portions) 15 and provide the support member 4 with split grooves 443 in correspondence to the flange portions 15, as shown in FIGS. 42 and 43. The arrangement shown in FIGS. 42 and 43 makes it possible to prevent undesired motion of the vibrator 1 even more effectively by the grooves 443 in the support member 4. The flange portions 15 are preferably located above the neutral plane of the vibration of the vibrator 1.

Preferably, the support member is sufficiently rigid to bear the pressure applied to the rotor. As a material for the support member, any elastic material, e.g. a metal, can be employed. More preferably, a vibration-damping alloy or the like is employed in order to cut off unnecessary vibration. In addition, it is preferable to dispose the support member at a position where no unnecessary vibration is generated.

The polymer member that is interposed between the vibrator and the support member functions as a stopper that prevents the vibrator from propagating unnecessary vibration to the support member when a torque derived from the vibration of the vibrator is transmitted to the rotor.

The polymer member is made of a polymer compound having vibration-proof properties. The vibration-proof properties include spring pressures in three directions (i.e., compression, shearing and tension) and attenuation (internal friction). More specifically, when periodic vibration is applied externally, the polymer member can disperse the force by virtue of the spring pressures in three directions and can delay the phase of the vibration by means of periodic strain viscosity obtained by the internal friction action occurring inside the material, and it is therefore possible to absorb the energy of the external force and attenuate high-frequency vibrations.

Examples of polymer compounds with vibration-proof properties usable in the present invention include resin materials such as urea resin, melamine resin, furan resin, polyurethane resin, acryl resin, ABS resin, fluoroethylene resin, silicone resin, diallylphthalate resin, epoxy resin, polyamide, polyacetal, polycarbonate, polyethylene terephthalate, polybutylene terephthalate, polyoxybenzylene, polyamino-bismaleate, polyamide-imide resin, azine resin, bismaleimide-triazine resin, polyether-imide resin, polyarylate, polyether sulfone, polyphenylene oxide, polyphenylene sulfide, polysulfone, polyether ethylketone, etc., and rubber polymers such as isoprene rubber, styrene butadiene rubber, butyl rubber, ethylene-propylene rubber, batadiene elastomer rubber, olefine elastomer rubber, polysulfide rubber, chloride rubber, nitrile elastomer rubber, etc. At least one of these polymer compounds may be employed. In addition, metal powder, inorganic powder or the like may be mixed with the above-described polymer compound to increase the anti-friction factor with a view to giving mechanical strength and heat resistance to the material.

To connect the vibrator and the support member through the polymer member, either the vibrator or the support member may be bonded to the polymer member. Alternatively, either the vibrator or the support member may be merely brought into contact with the polymer member. For example, the polymer member is bonded to either the vibrator or the support member by means of glueing, flame spraying or coating, thereby providing a rough surface for the contact between the polymer member and either the support member or the vibrator. The surface roughness of the contact between the vibrator and polymer member is preferably in the range of from 35 to 500 μm in terms of the finish mark.

Preferably, the specific acoustic impedance of the polymer member is largely different from that of the vibrator. If there is a large difference in specific acoustic impedance between the polymer member and the vibrator, it is possible to cut off unnecessary vibration generated in the vibrator when a torque derived from the vibration is transmitted to the rotor.

Generally, the specific acoustic impedance is given by the product of the density $\rho$ of a substance and the sound velocity c therein (i.e., $z = \rho \times c$). Accordingly, in order to increase the difference in specific acoustic impedance between the polymer member and the vibrator, it is preferable to employ a polymer material which is greatly different in either density or sound velocity from the vibrator. Assuming that the vibrator is made of iron, the specific acoustic impedance of the polymer is about 1/20 of that of iron since the density of the polymer is about 1/7 of that of iron and the sound velocity in the polymer is about ⅓ of that in iron.

Assuming that the specific acoustic impedance of iron is $z_1$ and the specific acoustic impedance of the polymer member is $z_2$, the reflecting factor r and transmission factor t of the sound pressure in a case where sound is treated as a plane wave are expressed as follows:

$$r = (z_2 - z_1)/(z_2 + z_1)$$

$$t = 2z_2/(z_2 + z_1).$$

The energy reflecting factor R and the energy transmission factor $\tau$ are given by $$R = \{(z_2 - z_1)/(z_2 + z_1)\}^2$$

$$\tau = 4z_1 z_2/(z_2 + z_1)^2.$$

The relationship between the reflecting factor R and the transmission factor $\tau$ may be expressed by $R + \tau = 1$ according to the energy conservation law. Thus, both R and $\tau$ are a function of the specific acoustic impedance alone. Therefore, the smaller $z_1$ in comparison to $z_2$, the closer to $R = 1$, so that it becomes more difficult for the sound energy to come out and the sound transmission energy also becomes smaller. Accordingly, among polymers, synthetic rubbers are particularly preferable because the difference between $z_1$ and $z_2$ is larger than in other polymers.

In a case where either the vibrator or the support member is merely in contact with the polymer member, the polymer member preferably has a high friction factor so as to be capable of preventing rotation of the vibrator or the support member at the area of contact between the polymer member and the vibrator or the support member. The force (frictional force) that causes the vibrator to rotate at the area of contact between the same and the support member when a torque derived from the vibration of the vibrator is transmitted to the rotor is proportional to the load applied to the vibrator and the friction factor at the joint area between the vibrator and the polymer member. When the load applied to the vibrator is constant, it is preferable that the polymer member should have a relatively large friction factor. In a case where both the vibrator and the support member are made of a steel material and the polymer member is a thermosetting resin material, the friction factor is 0.566, whereas, in a case where the polymer member is an amorphous plastifiable resin, the friction factor is 0.377. Thus, the frictional factor of the polymer member is preferably in the range of from 0.377 to 0.566.

The face of the vibrator at the side thereof which is opposed to the face for contact with the support member is not contacted by any member or portion (i.e., in a free state). More specifically, as shown in FIG. 38, no restraining member is present on the face 152 of the vibrator 1 at the side thereof which is opposed to the contact face 151. Accordingly, even if the vibrator receives the pressure applied to the rotor, it can be deformed freely, so that no unnecessary vibration is generated in and transmitted to the support member. In addition, it is possible to stabilize the friction contact between the vibrator and the rotor by reducing the deformation of the vibrator due to the applied pressure. For example, in the form wherein the vibrator is clamped by the support member, the joint of the vibrator and the support member has multiplanar contact and hence unnecessary vibration is generated in the support member.

It should be noted that the face of the vibrator that is in contact with the support member and other faces, exclusive of the face at the side which is opposed to the contact face, may be locked by the support member 4, as shown in FIG. 43, or may be free, as shown in FIG. 37.

Figure 44:
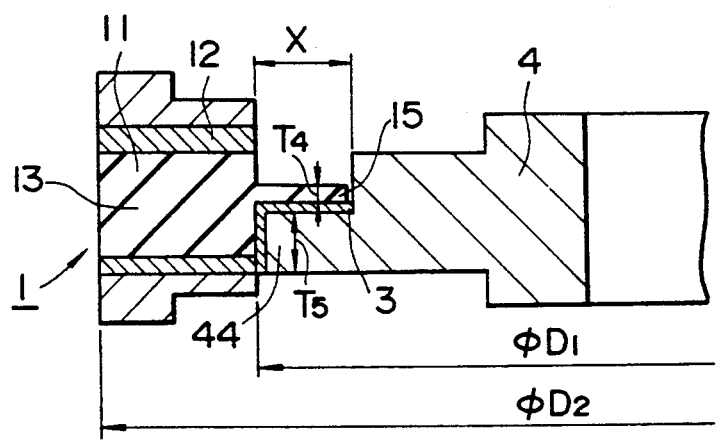
FIG. 44 is a sectional view of a joint of a vibrator and a support member in an ultrasonic motor according to one specific example of the present invention.

Referring to FIG. 44, assuming that the inner and outer diameters of the vibrator 1 are $D_1$ and $D_2$, respectively, the radial width X of the joint surface between the vibrator 1 and the support member 4 is preferably in the range of from $(D_2-D_1)/3$ to $(D_2-D_1)$. To cope with the pressure applied to the vibrator, it is preferable to increase the width X in order to increase the joint area. However, there are limitations on the outer and inner diameters of the vibrator 1. If the width X is less than the lower limit of the above-described range, the area of the portion of the vibrator which is in connection with the support member is small so that the support member cannot bear the applied pressure. The thickness $T_4$ of the portion 15 of the vibrator 1 which is in connection with the support member 4 is preferably within the range of from 1 to 2 mm, while the thickness $T_5$ of the portion 44 of the support member 4 which is in connection with the vibrator 1 is preferably not smaller than $5T_4$. $T_4$ which exceeds 2 mm leads to a loss of the vibration energy generated from the vibrator. On the other hand, $T_4$ which is smaller than 1 mm causes deformation of the portion of the vibrator that is in connection with the support member due to the applied pressure. $T_5$ is preferably not smaller than $5T_4$ so that the portion 44 is adequately rigid to bear the applied pressure.

The width of the polymer member 6 that is interposed between the vibrator 1 and the support member 4 is preferably equal to the width X of the joint surface between the vibrator 1 and the support member 4, and the thickness of the polymer member 6 is preferably in the range of from 0.3 to 1.0 mm (about ½ of $T_4$).

In addition, the vibrator 1 and the support member 4 may be connected through an area with an L-shaped cross-sectional configuration which is defined by an L-shaped polymer member 6, as shown in FIG. 38. With this arrangement, the amount of polymer material that is interposed between the vibrator 1 and the support member 4 is larger than in the case where the vibrator 1 and the support member 4 are connected through the polymer member 6 with an I-shaped cross-sectional configuration, so that the vibration-proof effectiveness is enhanced.

The joint surface between the vibrator and the support member is preferably disposed on the neutral plane P of the bending vibration where the vibration loss of the vibrator is minimal, as shown in FIGS. 37 and 42.

Figure 45:
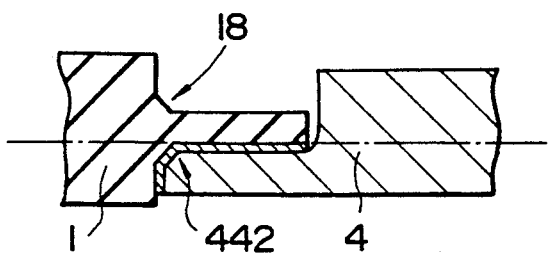
FIG. 45 is a sectional view of a joint of a vibrator and a support member in an ultrasonic motor according to one specific example of the present invention.

In addition, the gap 7 between the vibrator 1 and the support member 4 is preferably minimized, as shown in FIG. 37. By so doing, it is possible to prevent the deformation of the vibrator 1 and the support member 4 due to the applied pressure. Further, the roots 18 and 442 of the portion of the vibrator 1 which is connected to the support member 4 are preferably rounded and chamfered, as shown in FIG. 45.

The progressive wave type ultrasonic motor according to the present invention can be used in a wide variety of fields, for example, automotive electrical equipment, various kinds of robot from those for industrial use to those for domestic use, magnetism-optical disk memory, etc.

EMBODIMENTS

Embodiments of the present invention will be described below.

EMBODIMENT 1

Figure 2A:
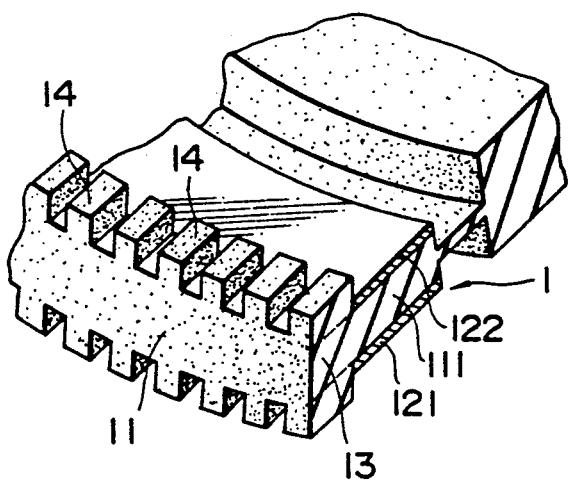
FIG. 2(a) is a partly-sectioned perspective view.
Figure 2B:
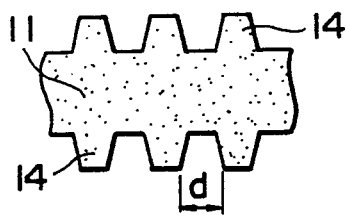
FIG. 2(b) is a plan view of the outer periphery thereof.
Figure 2C:
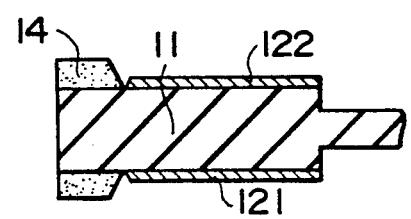
FIG. 2(c) is a sectional view thereof.

FIGS. 1 and 2 are a sectional view and partly-sectioned perspective view, respectively, of the progressive wave type ultrasonic motor in accordance with this embodiment. FIG. 2 is a view showing a stator portion of the ultrasonic motor shown in FIG. 1, in which: FIG. 2(a) is a partly-sectioned perspective view; FIG. 2(b) is a plan view of the outer periphery; and FIG. 2(c) is a sectional view.

Figure 11:
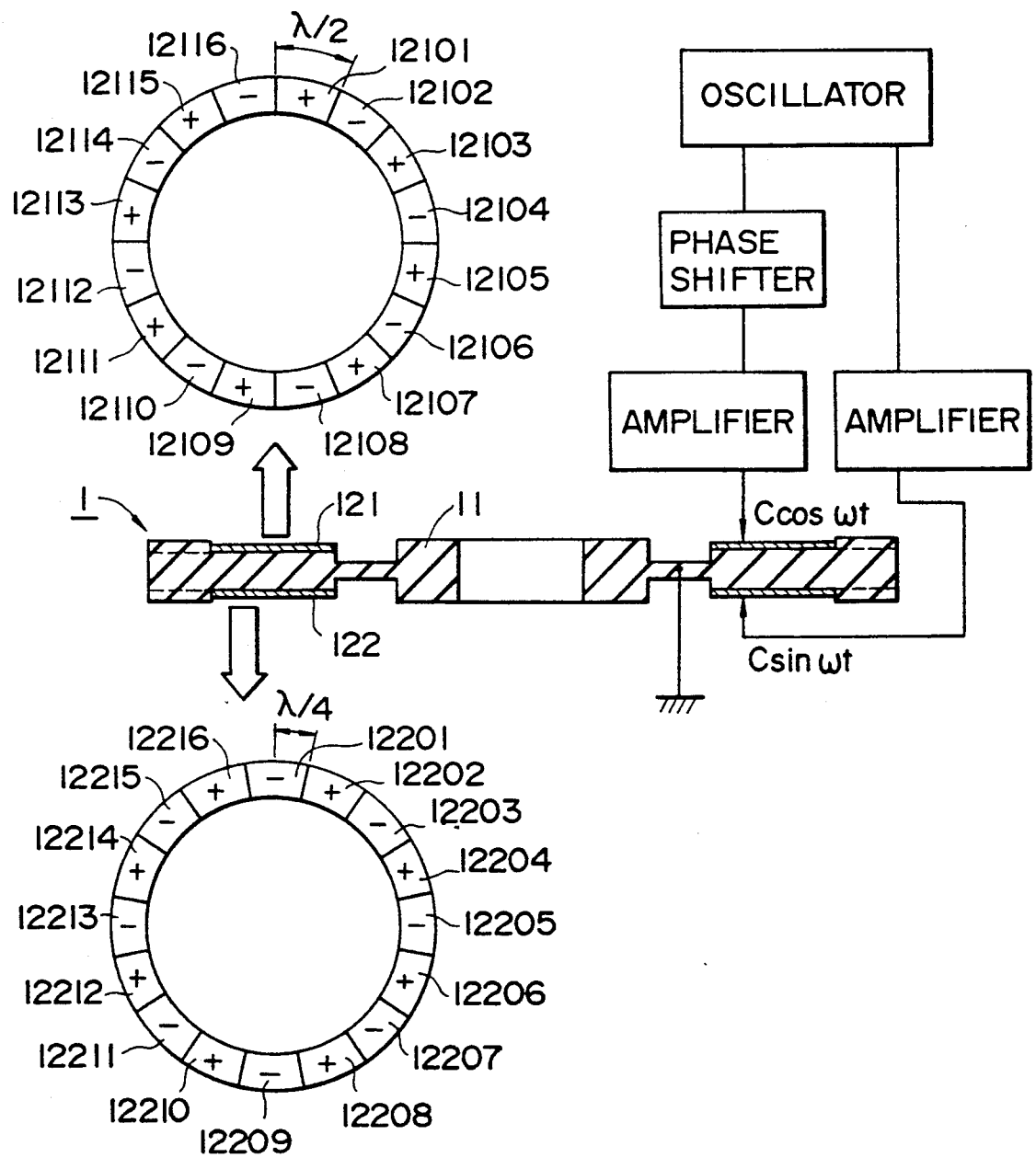
FIG. 11 shows an ultrasonic motor according to the first embodiment of the present invention in plan and sectional views and also shows a diagramn of a drive circuit thereof.

An elastic member 11, which is made of an elastic material, for example, a metal, has a circular configuration. The elastic member 11 has a symmetrical cross-sectional configuration with respect to both the axial center line and the diametrical center line. The upper and lower outer peripheral annular surfaces of the elastic member 11 are provided with radial projections 14, which are equally spaced circumferentially. Two annular piezoelectric ceramics 121 and 122 made of PZT [Pb(Zr,Ti)O$_3$] are disposed on the upper and lower surfaces, respectively, of the elastic member 11, which are inward of the outer peripheral annular surfaces, the piezoelectric ceramics 121 and 122 being spatially offset from each other by the quarter-wavelength. Thus, a stator 1 is formed. The piezoelectric ceramics 121 and 122 are formed with respective groups of regions 12101 to 12116 and 12201 to 12216, which are equally divided by the half-wavelength ($\lambda$) and polarized to provide piezoelectric effects which are alternately different in directivity, as shown in FIG. 11. Each pair of adjacent regions divided by the half-wavelength are polarized in opposite relation to each other, i.e., + and −, in the direction of the thickness thereof. With the elastic member 11 and the two annular piezoelectric ceramics 121 and 122 defined as a stator 1, high frequency voltages which are 90° out of phase with each other are synchronously input to the piezoelectric ceramics 121 and 122 with matching attained in the electric resonance state including the elastic member 11, as shown in FIG. 11. In consequence, a phonomenon which is similar to the generation of a progressive wave shown in FIG. 5 occurs on each of the upper and lower outer peripheral annular surfaces of the elastic member 11. It should be noted that, in FIG. 11, two-phase sine waves are generated from an oscillator, one of the two-phase sine waves being phase-shifted 90° by use of a phase shifter, thus inputting a sine wave and a cosine wave to the two piezoelectric ceramics, respectively, after the electric signals have been amplified through respective wideband, high-output power amplifiers.

In addition, a support member 43 is provided at a lower annular portion 1111 of the elastic member 11 which is inwardly separate from the portion 111 to which the two piezoelectric ceramics 121 and 122 are attached, as shown in FIG. 1. Accordingly, the bending vibration that is generated from the piezoelectric ceramics 121 and 122 is not propagated directly to the support member 43, so that the vibration mode is not distorted.

A vibration transmitting portion 13 is formed at the outer periphery of the elastic member 11 at a position which is outward of the piezoelectric ceramic attaching portion 111. The radial projections 14 are provided on the upper and lower sides of the vibration transmitting portion 13 at respective positions which are equally spaced circumferentially.

The thickness $T_1$ of the portion 111 of the elastic member 11 where the piezoelectric ceramics 121 and 122 are attached is substantially equal to the thickness $T_2$ of the vibration transmitting portion 13 at the region thereof where no projection 14 is provided.

A circular rotor 2 is mounted on the vibration transmitting portion 13. The rotor 2 comprises a rotor member 21 made of an elastic material, e.g., a metal, and a lining member 22 made of a material which has a large friction factor and which can efficiently convert the vibration energy into torque energy, e.g., engineering plastics, the lining member 22 being bonded to the rotor member 21. The lining member 22 of the rotor 2 is brought in contact with the projections 14 of the vibration transmitting portion 13, thereby bringing the rotor 2 into press contact with the stator 1.

The rotor 2 is brought into press contact with the stator 1 by a mechanism that comprises a dish spring 52 that applies compressive force to the upper side of the rotor 2 through a damping material 51, e.g., a rubber, which serves as both a slip-proof member and a vibration-proof member. More specifically, the dish spring 52 is secured by a shaft 53, which is supported at the upper end thereof by a thrust bearing 54, and a cover 55 is secured by screwing to the support member 43 which also serves as a pedestal. With this structure, the shaft 53 is supported at both ends thereof by the thrust bearing 54 and a radial bearing 56 which is provided in the pedestal 43 and, therefore, no runout occurs.

FIGS. 3 and 6 to 10 show prior arts for comparison.

In the prior art shown in FIG. 3, a stator 1 comprises a circular elastic member 11 which is provided with circumferentially spaced radial slits and a single ring-shaped piezoelectric ceramic 12 (see FIG. 4) which is disposed directly below the elastic member 11, and an annular rotor 2 is brought in press contact with the elastic member 11 through a lining member 22 bonded to the elastic member 11, thereby obtaining a torque (the same is the case with the prior arts shown in FIGS. 6 to 10).

Figure 6:
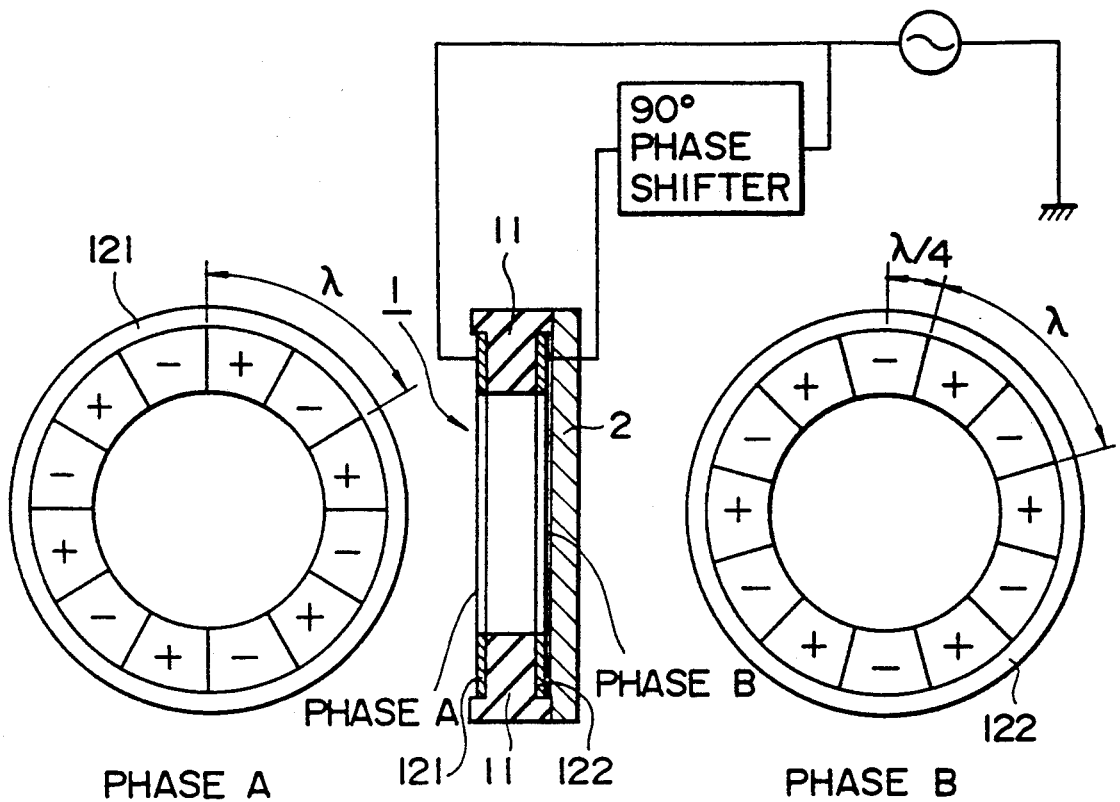
FIG. 6 shows an ultrasonic motor according to another related art in plan and sectional views and also shows a diagram of a drive circuit thereof.

The prior art shown in FIG. 6 includes a stator which is arranged such that annular piezoelectric ceramics 121 and 122 such as those shown in FIG. 11 are disposed on an elastic member 11 with a phase difference of $\frac{1}{4}\lambda$ and the thickness of the vibration transmitting portion is made larger than that of the portion to which the piezoelectric ceramics 121 and 122 are attached. With such a stator arrangement, a torque is obtained by a means similar to that in the arrangement shown in FIG. 3.

Figure 7:
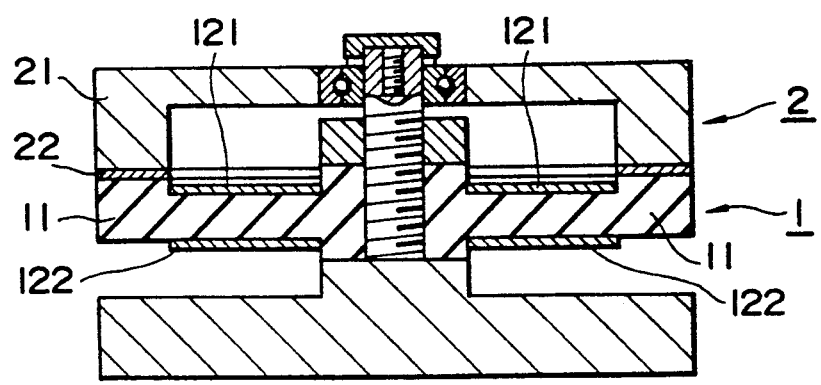
FIG. 7 is a sectional view of an ultrasonic motor according to another related art.

In the prior art shown in FIG. 7, piezoelectric ceramics 121 and 122 which are similar to those shown in FIG. 6 are disposed on an elastic member 11, and the thickness of the vibration transmitting portion is made larger than that of the portion to which the piezoelectric ceramics 121 and 122 are attached without considering whether or not the elastic member 11 has a symmetric configuration with respect to the diametrical center line. With such an arrangement, a torque is obtained by a means similar to that in the arrangement shown in FIG. 3.

Figure 8:
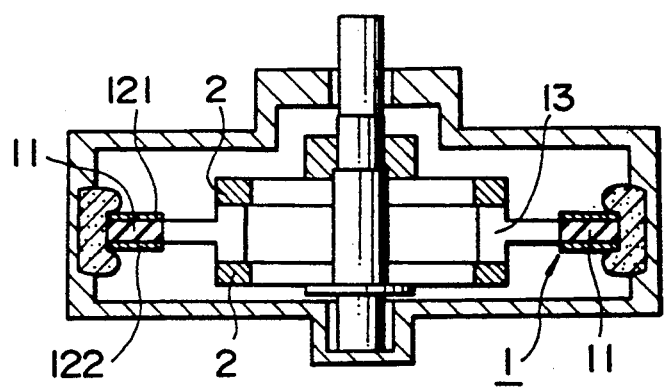
FIGS. 8 and 9 are a sectional view and a fragmentary exploded perspective view of an ultrasonic motor according to another art, respectively.
Figure 9:
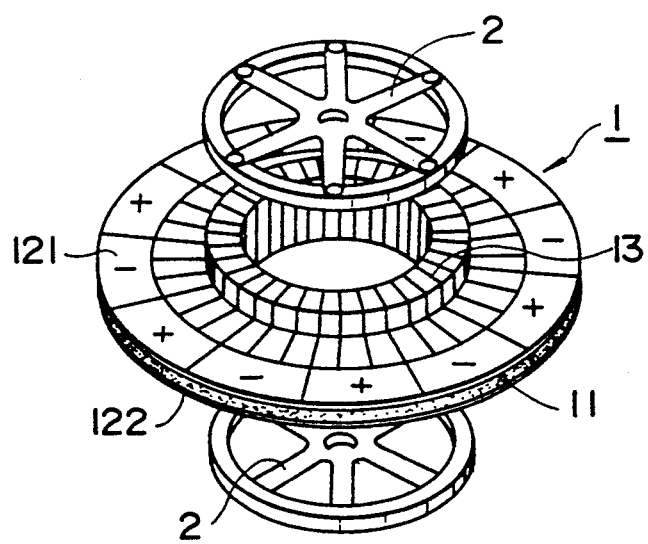
Figure 10:
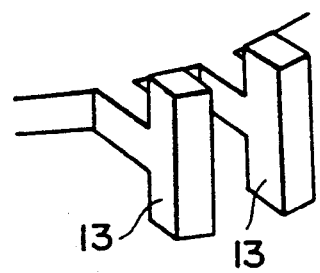
FIG. 10 is a fragmentary enlarged view of vibratory pieces projecting from a driving force transmitting portion of the ultrasonic motor shown in FIGS. 8 and 9.

In the prior art shown in FIGS. 8 and 9, an elastic member 11 is provided with piezoelectric ceramics which are similar to those shown in FIG. 6 and is slit at equal spacings in the circumferential direction, thereby defining a plurality of radially projecting vibratory pieces (see FIG. 10) for generating vibrations. With such an arrangement, a torque is obtained by a means similar to that in the arrangement shown in FIG. 3. It should be noted that FIG. 8 is a sectional view of the arrangement shown in FIG. 9.

Figure 14:
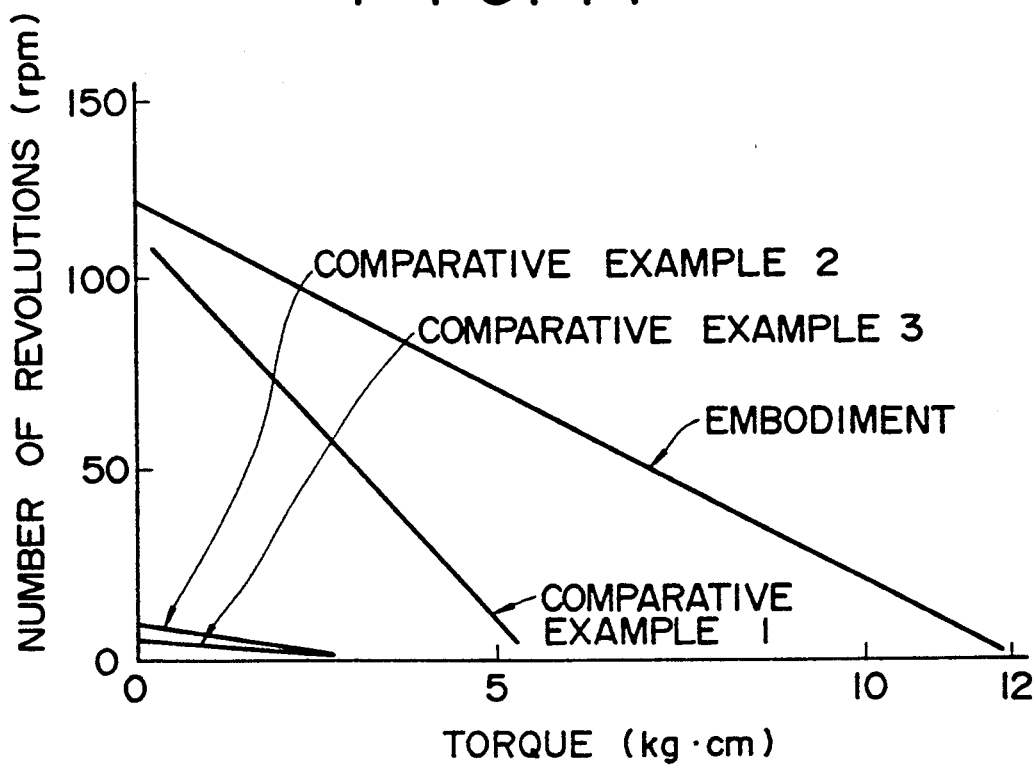

The above-described five different examples were comparatively tested for electric characteristics, mechanical vibration condition and motor performance. Some of the testing results are shown in FIGS. 12 to 14.

Figure 12:
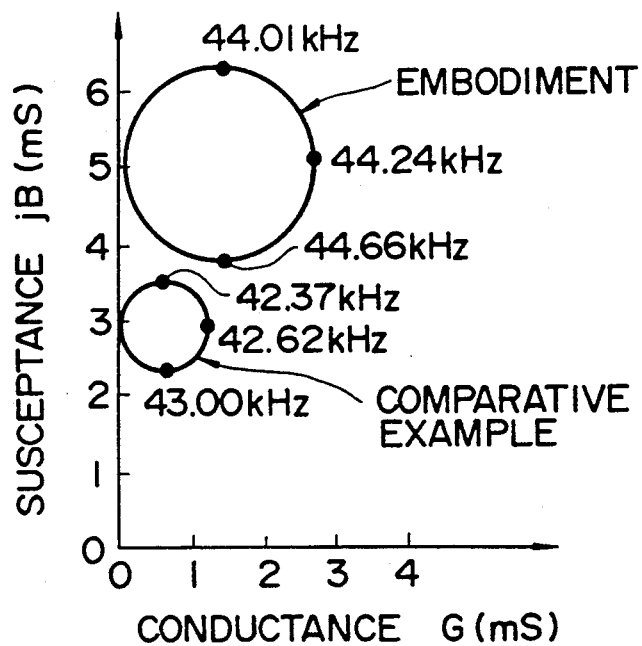
FIGS. 12 to 14 are graphs showing electric characteristics of the ultrasonic motors according to the first embodiment and the comparative examples, together with mechanical vibration conditions of the stators of these motors and the motor performances.

FIG. 12 shows the results of the comparison made as to the electric characteristics between the embodiment of the present invention and the comparative example (the prior art shown in FIG. 3) in the motor assembly state, that is, the comparison between the arrangement comprising two piezoelectric ceramics and the arrangement comprising a single piezoelectric ceramic. More specifically, when the stator is in an electric resonance state, it can be simplified in the form of a series-parallel resonance circuit with three factors, that is, L, C and R (coil, condenser and resistor). Therefore, with the driving voltage maintained at a constant level, the driving frequency of the electrical power input was varied to allow the phase angle relative to the magnitude of the current flowing and the terminal voltage (assumed to be 12 V) to draw a loop (circle) on a complex plane as a dynamic admittance circle for comparison.

As will be clear from FIG. 12, since the driving area of the piezoelectric ceramics in the embodiment of the present invention is double the driving area in the comparative example, the conductance (the reciprocal of the resistance; i.e., conductivity) G is similarly about double that in the comparative example. In other words, the admittance current is easier to flow and the electromechanical conversion efficiency rises, so that it becomes possible to achieve efficient drive.

With regard to stators employing two piezoelectric ceramics, the embodiment of the present invention and the comparative examples having an elastic member which was not uniform in thickness at the piezoelectric ceramic attaching portion and at the vibration transmitting portion, as shown in FIGS. 6, 7 and 8, were comparatively observed as to the mechanical vibration mode in the stator state. More specifically, observation was conducted by a method wherein a double exposure hologram was made for a vibratory state and stationary state of the face of the stator that was in contact with the rotor by use of a double-pulse laser light source, thereby obtaining an interference mode corresponding to the vibrational amplitude. FIG. 13 shows the results of the observation. In the figure, striped patterns show the mechanical vibrational amplitude condition of the stator in the form of contour lines (each striped pattern being equivalent to a displacement of 0.347 μm). In FIG. 13, A shows the vibrational amplitude condition of the stator in the comparative example shown in FIG. 6, B the comparative example shown in FIG. 7, C the comparative example shown in FIG. 8, and D the embodiment of the present invention.

As will be clear from FIG. 13, in the embodiment of the present invention, a basic vibration mode of progressive wave with a large mechanical vibrational amplitude is obtained on the annular outer peripheral surface of the stator by virtue of the above-described stator structure, and the striped patterns in the form of contour lines are denser than in the comparative examples, so that the vibrational amplitude is large, as shown in the right-hand side of FIG. 13.

Thus, the embodiment of the present invention is superior to the comparative examples in the electric characteristics (see FIG. 12) and the mechanical vibration condition (see FIG. 13).

Figure 3:
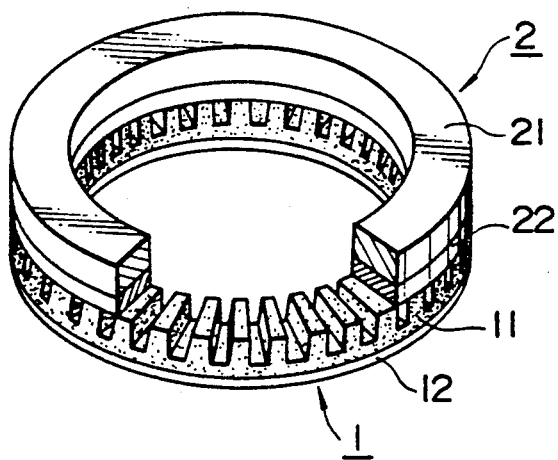
FIG. 3 is a perspective view of a conventional ultrasonic motor.
Figure 4:
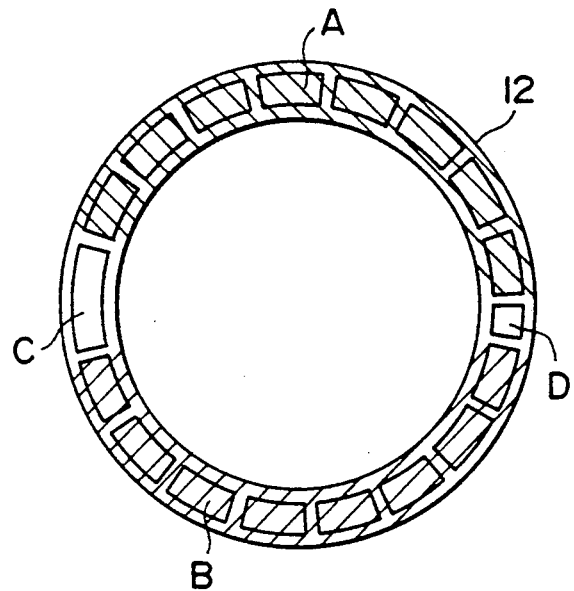
FIG. 4 is a plan view of a piezoelectric ceramic of the conventional ultrasonic motor.

Further, motor performance characteristics (rotational speed-torque characteristics) were evaluated using the embodiment and the comparative examples shown in FIGS. 3, 7 and 8. FIG. 14 shows the results of the evaluation. In the figure, comparative example 1 is similar to the example shown in FIG. 3, comparative example 2 to the example shown in FIG. 7, and comparative example 3 to the example shown in FIG. 8.

As will be clear from FIG. 14, the embodiment of the present invention makes it possible to obtain a motor which is superior to the comparative examples in both the number of revolutions and the torque, the latter being particularly high. This is because the electromechanical conversion efficiency is excellent by virtue of the structure in which the pressure applied to the rotor has no direct effect on the piezoelectric ceramics. In addition, since the stator has a portion which is substantially equal in thickness to the vibration transmitting portion, an ideal vibration mode can be induced in the vibration transmitting portion and hence a large vibrational amplitude is obtained.

EMBODIMENT 2

FIG. 15 shows a progressive wave type ultrasonic motor according to this embodiment.

The motor of this embodiment employs two stators 1 and an annular rotor 2 comprising a rotor member 21 and two lining members 22 bonded to the rotor member 21, the stators 1 being simultaneously brought into press contact with the upper and lower sides, respectively, of the rotor 2. Accordingly, the drive source is double that in the embodiment 1 and it is therefore possible to obtain a torque which is double that in the embodiment 1.

In this embodiment, the mechanism for bringing the rotor 2 and the stators 1 into press contact with each other does not employ the dish spring 52 as in the embodiment 1, but it is arranged such that the stators 1, which are supported by a pedestal 43, are screwed to a cover 55 and the height of the cover 55 is varied to apply a pressure for contact. The rotor 2 is supported on a shaft 53 through a snap ring, key or the like.

Thus, in the embodiment 2 the parts of the embodiment 1 can be utilized as common parts without a change or modification simply by adding the cover 55 and securing the rotor 2 to the shaft 53, thereby enabling an increased torque to be taken out with ease.

EMBODIMENT 3

In this embodiment, the relationship between the electrical vibration characteristics and the dimensional configuration of the elastic member in the stator of the motor is shown.

Figure 13A:
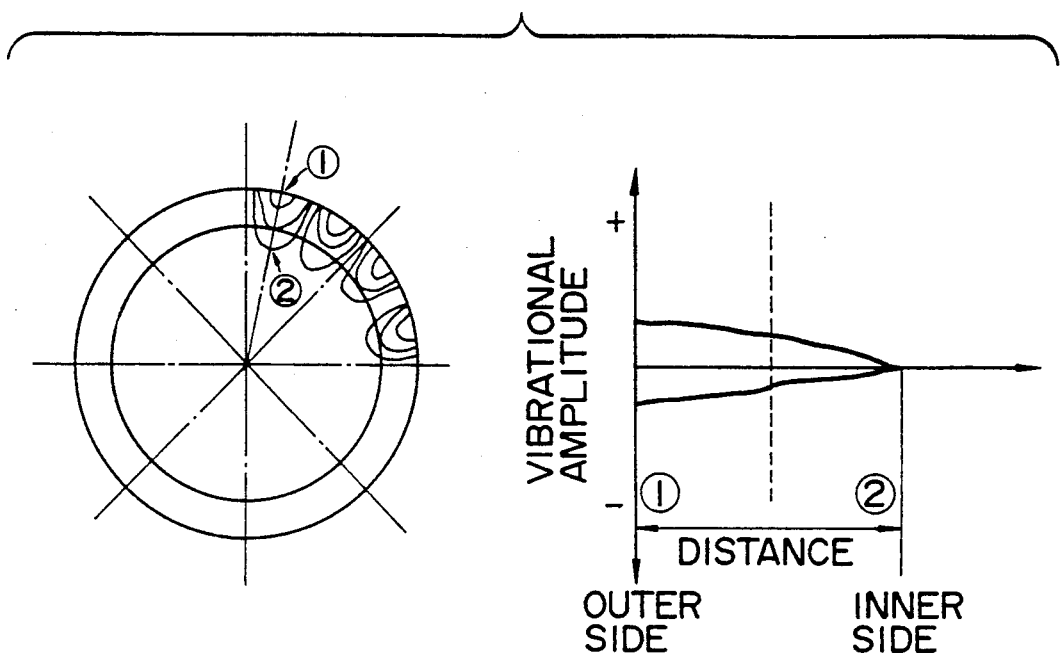
Figure 13B:
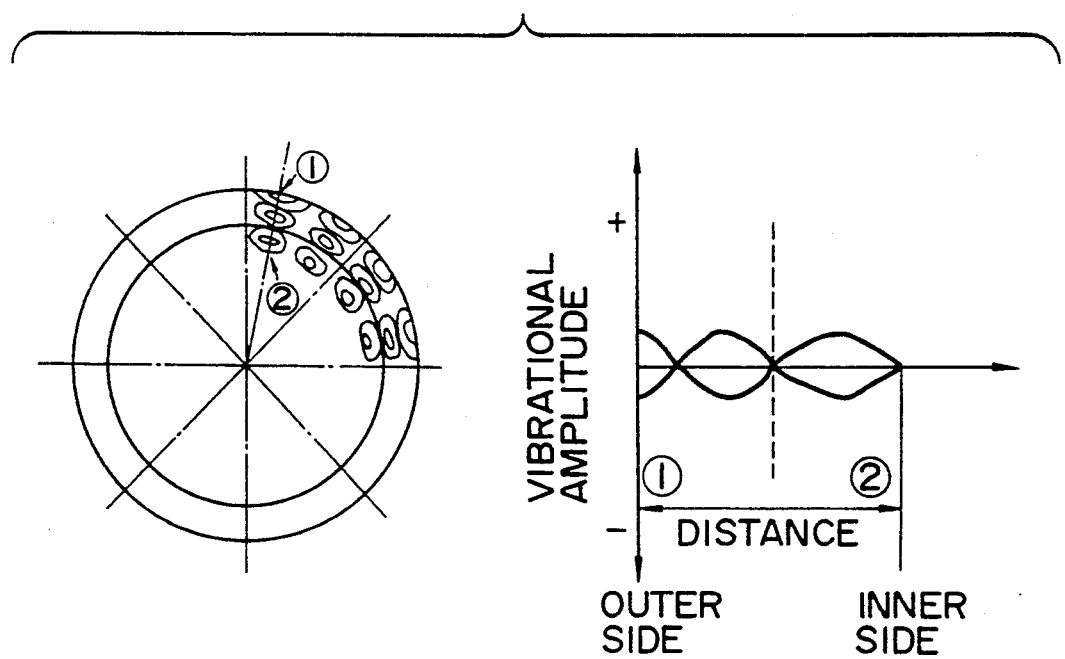
Figure 13C:
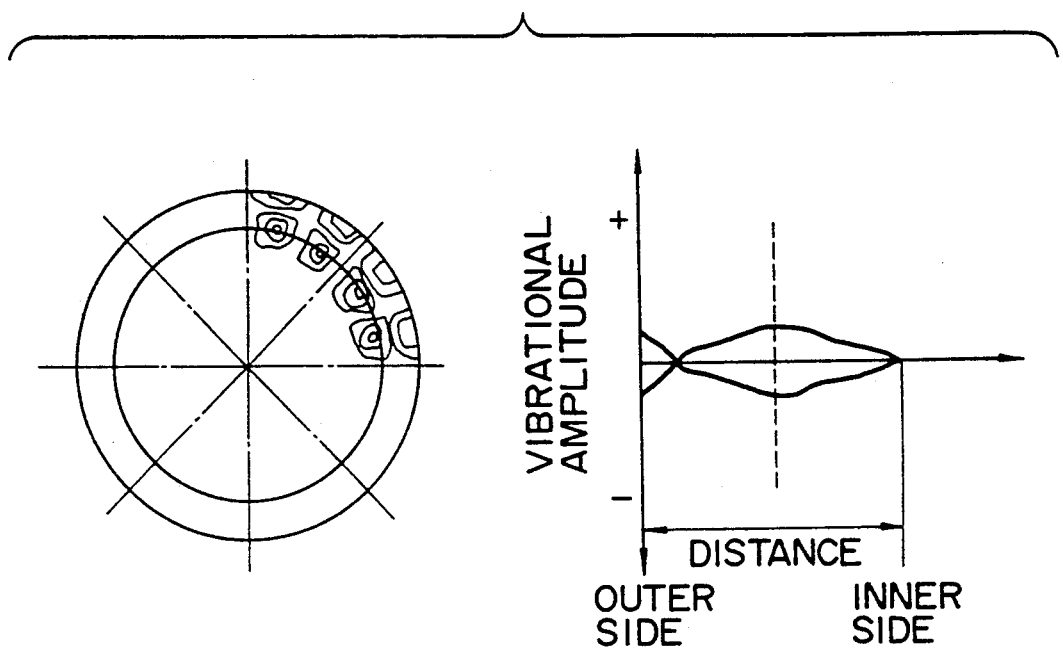
Figure 13D:
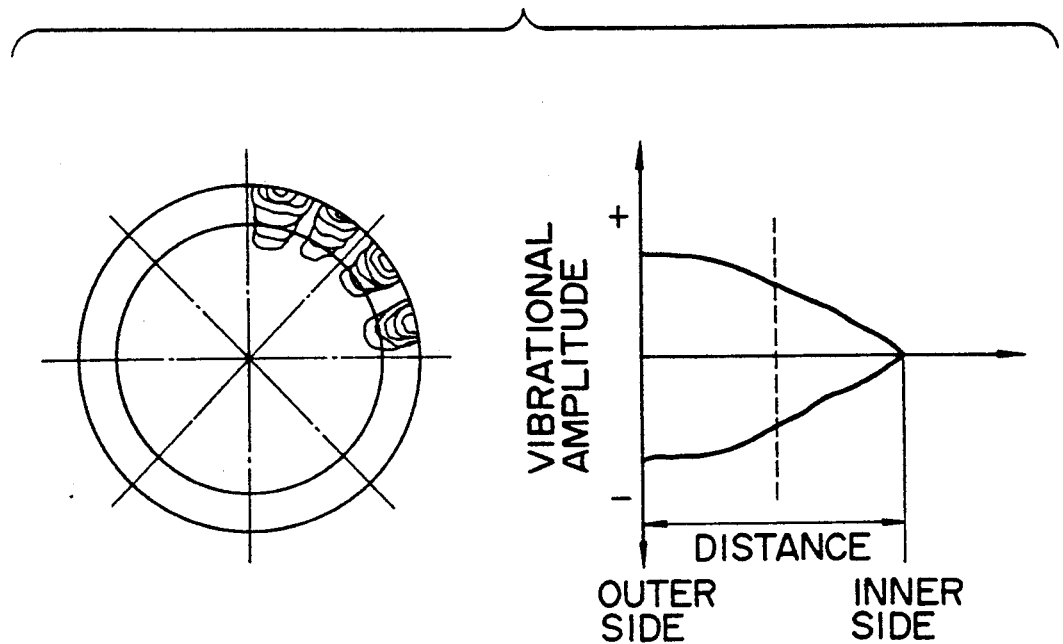
Figure 16:
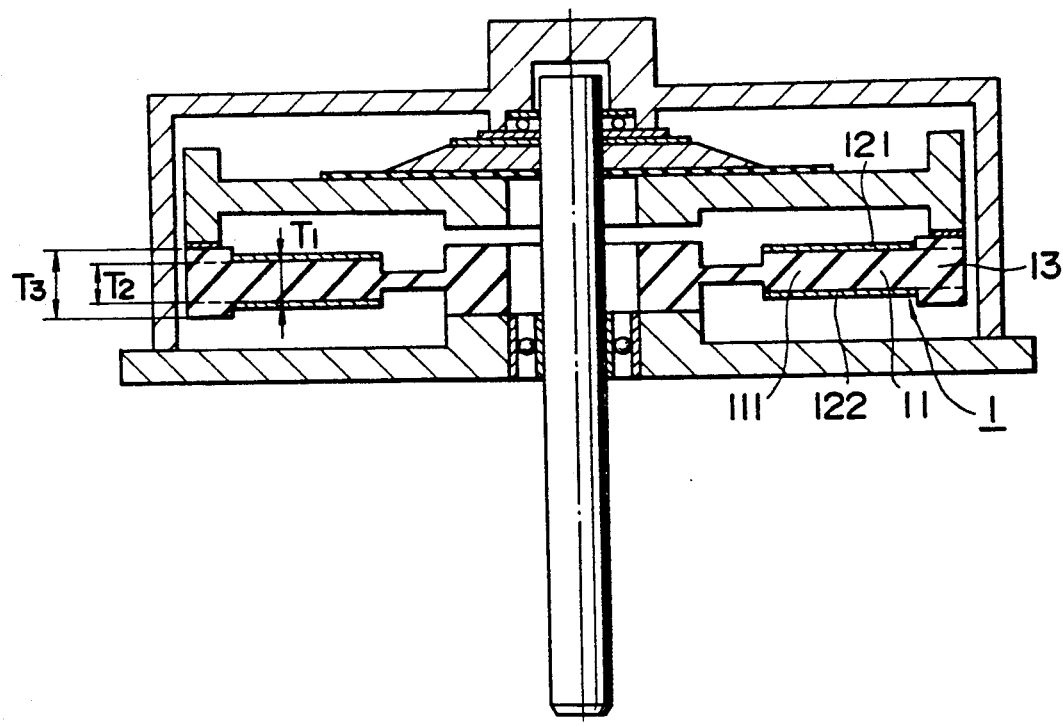
FIG. 16 is a sectional view of an ultrasonic motor according to a third embodiment of the present invention.
Figure 17:
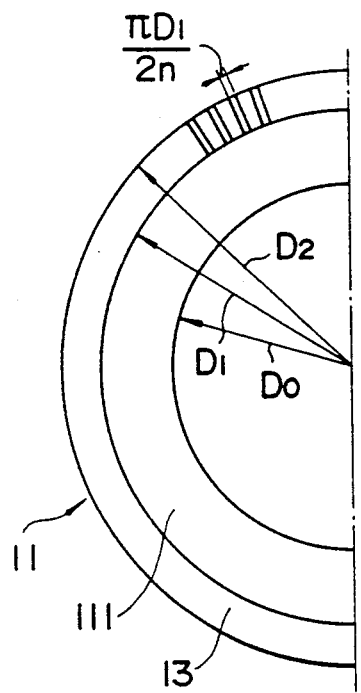
FIG. 17 is a fragmentary plan view of a stator of the ultrasonic motor shown in FIG. 16.

The most important dimension of the arrangement in which an annular elastic member 11 is clamped at the upper and lower sides thereof by two ring-shaped piezoelectric ceramics 121 and 122, as shown in FIGS. 16 and 17, is the thickness $T_2$ of the portion that causes a bending vibration between the ring-shaped piezoelectric ceramics 121 and 122. By varying this dimension, the vibration characteristics during electric resonance can be changed. Electric resonance characteristics were measured in regard to a case where chrome-molybdenum steel was employed as a material for the elastic member and the thickness $T_2$ of the elastic member at the vibration transmitting portion and the thickness $T_1$ at the piezoelectric ceramic-clamped portion were substantially equal to each other and the thickness ($T_1 = T_2$) of the elastic member was varied in the range of from 1.0 to 3.0 mm. As a result, it was possible to set the resonance frequency in the range of from 35 to 50 kHz when the thickness of the elastic member was set in the range of from 2.0 to 3.0 mm, and by so doing, it was possible to obtain the most ideal vibration mode of progressive wave, as shown in FIG. 13D.

Accordingy, it is the best practice to set the thickness of the elastic member within the range of from 2.0 to 3.0 mm when the resonance frequency is set in the range of from 35 to 50 kHz to obtain an adequately large vibrational amplitude for practical use.

With regard to the dimensional configuration of the elastic member with which vibration characteristics of the resonance frequency indicated by the symbol D can be obtained, when $T_1 = 2.0$ to 3.0 mm, the thickness $T_3$ of the vibration transmitting portion including the projections is preferably within the range of $T_3 = (1.5$ to $2.3)T_2$. When the inner diameter $D_1$ of the vibration transmitting portion is 60 mm, the outer diameter $D_2$ of the vibration transmitting portion is preferably within the range of $(1.03$ to $1.16)D_1$, and the inner diameter $D_0$ of the piezoelectric ceramic-clamped portion is preferably not larger than $\frac{2}{3} D_1$. When the number n of projections provided around the annular outer periphery of the elastic member is set at 60 to 80, the distance (d in FIG. 2) between each pair of adjacent projections is preferably not larger than $(\pi D_1/2n)$.

EMBODIMENT 4

Figure 22:
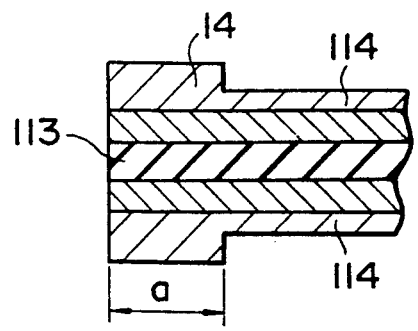
FIG. 22 is a sectional view of the vibration transmitting portion of the vibrator in the ultrasonic motor shown in FIG. 18.

FIG. 18 is a sectional view showing the general arrangement of a progressive wave type ultrasonic motor according to this embodiment; FIG. 19 is a partly-sectioned perspective view of a driving force transmitting portion of a vibrator in the ultrasonic motor; FIG. 20 is a plan view of a portion of the vibrator to which piezoelectric ceramics are attached; FIG. 21 is a plan view of the outer peripheral surface of the vibrator; and FIG. 22 is a sectional view of the vibrator.

An elastic member 11, which is made of an elastic material, for example, a metal, has a circular configuration. The elastic member 11 has a symmetrical cross-sectional configuration with respect to both the axial center line and the diametrical center line. The elastic member 11 comprises an inner portion 113 and upper and lower portions (elastic plates) 114. Two annular piezoelectric ceramics 12 made of PZT [Pb(Zr,Ti)O$_3$] are disposed on the upper and lower outer peripheral surfaces, respectively, of the inner elastic member portion 113, the piezoelectric ceramics 12 being spatially offset from each other by the quarter-wavelength. The elastic plates 114 are attached to the upper and lower outer peripheral annular surfaces, respectively, of the two piezoelectric ceramics 12, each elastic plate 114 being provided with radial projections 14, which are equally spaced circumferentially. As is readily apparent upon comparison of FIGS. 1 and 18, the projections 14 may either be formed integrally with the elastic member 13 as shown in FIG. 1, or may be formed separately as shown in FIG. 18. Thus, a vibrator (stator) 1 is formed. It should be noted that the thickness of the inner portion 113 of the elastic member 11 at the portion to which the piezoelectric ceramics 12 are attached is equal to the thickness at the driving force transmitting portion. The piezoelectric ceramics 12 are each formed with regions which are equally divided by the half-wavelength ($\lambda$) and polarized to provide piezoelectric effects which are alternately different in directivity, as shown in FIG. 20. With the elastic member 11 and the two annular piezoelectric ceramics 12 defined as a stator 1, high frequency voltages which are 90° out of phase with each other are synchronously input to the piezoelectric ceramics 12 with matching attained in the electric resonance state including the vibrator 1. In consequence, a phonomenon which is similar to the generation of a progressive wave shown in FIG. 5 occurs on each of the upper and lower outer peripheral annular surfaces of the stator 1. It should be noted that, in FIG. 20, two-phase sine waves are generated from an oscillator, one of the two-phase sine waves being phase-shifted 90° by use of a phase shifter, thus inputting a sine wave and a cosine wave to the two piezoelectric ceramics, respectively, after the electric signals have been amplified through respective high-output power amplifiers.

In addition, the stator 1 has a support portion 41 and a fixed portion 42 provided at a lower annular portion of the elastic member 11 which is inwardly separate from the portion to which the two piezoelectric ceramics 12 are attached. Accordingly, the bending vibration that is generated from the piezoelectric ceramics 12 is not propagated directly to the support portion 41 and the fixed portion 42, so that the vibration mode is not distorted.

The radial projections 14 are provided on the upper and lower sides of the driving force transmitting portion 13 at respective positions which are equally spaced circumferentially.

A circular rotor 2 is mounted on the driving force transmitting portion 13. The rotor 2 comprises a rotor member 21 made of an elastic material, e.g., a metal, and a friction member 22 comprising a material which has a large friction factor and which can efficiently convert the vibration energy into a torque, e.g., engineering plastics, the friction member 22 being bonded to the rotor member 21. The friction member 22 of the rotor 2 is placed in contact with the projections 14 of the vibration transmitting portion 13, thereby bringing the rotor 2 into press contact with the stator 1.

The projections 14 are provided on the outer peripheral surface of the driving force transmitting portion 13, each projection 14 having a length not larger than ⅛ of the wavelength of the vibratory wave generated at the driving force transmitting portion 13. The rotor 2 is in press contact with the stator 1 through the projections 14.

The rotor 2 is brought into press contact with the stator 1 by a mechanism that comprises a dish spring 52 that applies compressive force to the upper side of the rotor 2 through a damping material 51, e.g., a rubber, which serves as both a slip-proof member and a vibration-proof member. More specifically, the dish spring 52 is secured by a shaft 53, which is supported at the upper end thereof by a thrust bearing 54, and a cover 55 is secured by screwing to the support member 43 which also serves as a pedestal. With this structure, the shaft 53 is supported at both ends thereof by the thrust bearing 54 and a radial bearing 56 which is provided in the pedestal 43 and, therefore, no run-out occurs. In this embodiment, the stator 1 has a diameter of 60 mm to generate 8 waves in the circumferential direction. The support portion 41 and fixed portion 42 of the stator 1 are disposed on the neutral axis P$_2$ of the bending vibration.

Figure 30:
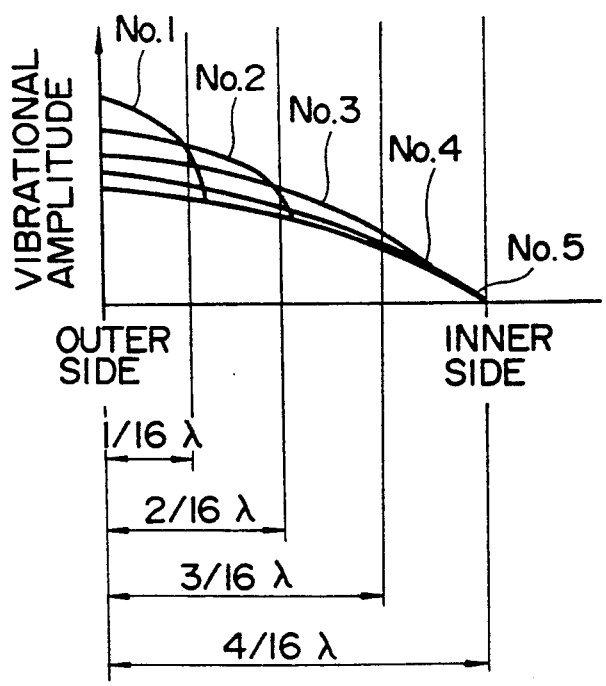
FIG. 30 is a graph showing a vibrational amplitude distribution of vibratory waves generated in the ultrasonic motor of the embodiment.

With the length (a in FIG. 22) of the projections 14 at the driving force transmitting portion 13 of the ultransonic motor according to this embodiment being variously changed, the radial amplitude of the vibratory wave transmitted from the stator to the rotor was measured. It should be noted that a in FIG. 22 and in Table 1 below represents the radial length of the projections 14. In addition, the relationship between the height h and width w of the projections 14 was set at h/w=1, as shown in FIG. 21. The results of the measurement are shown in FIG. 30. As will be clear from FIG. 30, as the length of the projections becomes shorter, the unnecessary added mass decreases, so that the amplitude of the transmitted vibration at the outer peripheral portion increases. It will also be understood that, since it is preferable that the area of the contact surface for rotating the rotor should be large, the practically optimal length of the projections is ⅛ or less of the wavelength.

TABLE 1

| Sample No. | 1 | 2 | 3 | 4 | 5 |
|---|---|---|---|---|---|
| Length a of projections | 1/16$\lambda$ | 2/16$\lambda$ | 3/16$\lambda$ | 4/16$\lambda$ | no projection |

Figure 31:
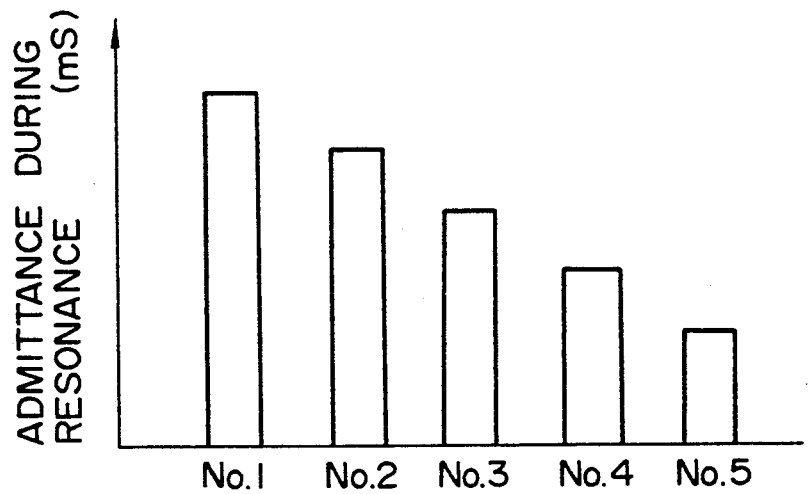
FIG. 31 is a graph showing admittance characteristics during resonance of the ultrasonic motor of the embodiment.

With regard to the ease of application of the electrical power input (i.e., the ease of generation of vibration with a large amplitude), the admittance of the samples shown in Table 1 was measured with an admittance analyzer. The results of the measurement are shown in FIG. 31. It will be clear from FIG. 31 that, as the radial length of the projections becomes smaller, the admittance during the resonance increases, so that a larger electrical power can be input. Accordingly, the smaller the radial length of the projections, the larger the electrical power input, and hence the larger the mechanical vibrational amplitude. Thus, the torque of the ultrasonic motor can be increased.

COMPARATIVE EXAMPLE 4

Figure 32:
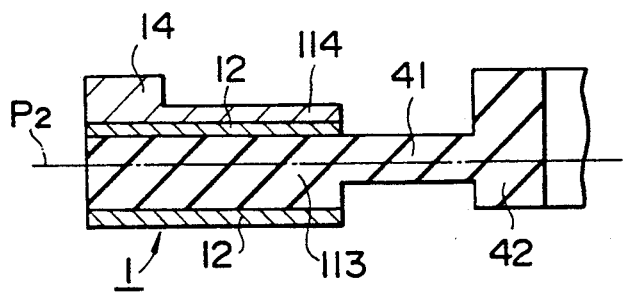
FIG. 32 is a sectional view of a vibrator in an ultrasonic motor according to one comparative example.
Figure 33:
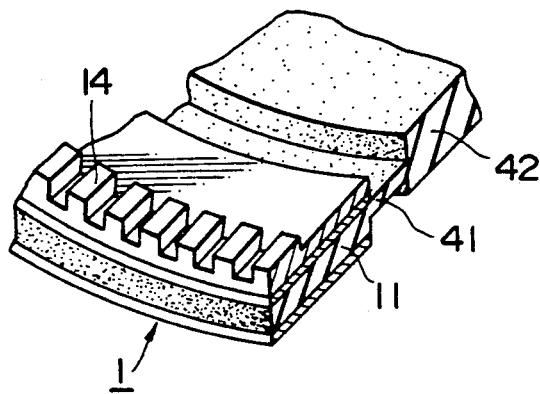
FIG. 33 is a partly-sectioned perspective view of the vibrator of the ultrasonic motor shown in FIG. 32.
Figure 34:
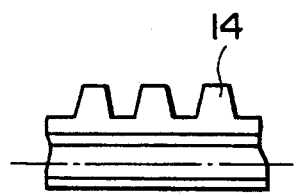
FIG. 34 is a plan view of the vibrator of the ultrasonic motor shown in FIG. 32.

In this embodiment, as shown in FIGS. 32 to 34, the diametrical center axis of the support portion 41 of the vibrator 1 is set at a lower portion of the fixed portion 42 and thus disposed on the neutral axis $P_2$ of the bending vibration, and the projections 14 are provided only on the upper surface of the vibrator 1, thereby forming a structure in which the fixed portion 42 of the vibrator 1 is asymmetrical with respect to the neutral axis $P_2$.

In this structure, the asymmetrical arrangement with respect to the neutral axis $P_2$ prevents efficient transmission of the vibration.

EMBODIMENT 5

Figure 35:
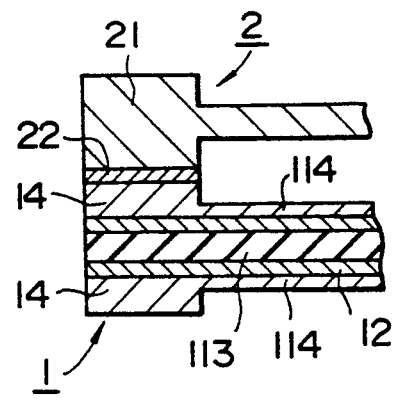
FIG. 35 is a fragmentary sectional view showing a vibrator and rotor of an ultrasonic motor according to one embodiment of the present invention.

In this embodiment, a rotor 2 having a friction face (i.e., a face that receives a torque) with the same radial length as that of the projections 14 of the vibrator 1 is provided, as shown in FIG. 35. This embodiment is similar to the embodiment 4 except for the above-described structure.

Motor performance (rotational speed-torque characteristics) was measured in regard to 16 different types of ultrasonic motor formed by combining together four different types of vibrator in which the radial lengths of the projections 14 are respectively equal to those of the samples Nos. 1 to 4, shown in Table 1, in the embodiment 4 and four different types of rotor having respective friction faces with radial lengths equal to those of the projections of the vibrators. As a result, the combinations of the vibrators corresponding to the samples Nos. 1 and 2 and the rotors having respective friction faces with radial lengths equal to those of the projections of these vibrators were the best in terms of the driving force. Thus, if the radial length of the projections of the vibrator from the outer peripheral surface is not greater than $\frac{1}{8}\lambda$ and the radial length of the friction face of the rotor is equal to that of the projections, the torque derived from the vibration can be transmitted to the rotor most efficiently.

EMBODIMENT 6

FIG. 36 is a sectional view of a progressive wave type ultrasonic motor according to this embodiment; FIG. 37 is an enlarged view of the joint of a vibrator and a support member in the ultrasonic motor; and FIG. 38 is a further enlarged view of the joint.

An elastic member 11, which is made of an elastic material, for example, a metal, has a circular configuration. The elastic member 11 has a symmetrical cross-sectional configuration with respect to both the axial center line and the diametrical center line. The elastic member 11 comprises an inner portion 113 and outer portions (elastic plates) 114. Two annular piezoelectric ceramics 12 made of PZT [Pb(Zr,Ti)O$_3$] are disposed on the upper and lower surfaces, respectively, of the inner elastic member portion 113, which are inward of the outer peripheral surfaces, the piezoelectric ceramics 12 being spatially offset from each other by the quarter-wavelength. The elastic plates 114 are attached to the upper and lower outer peripheral annular surfaces, respectively, of the two piezoelectric ceramics 12, each elastic plate 114 being provided with radial projections 14, which are equally spaced circumferentially. Thus, a stator 1 is formed. It should be noted that the thickness of the inner portion 113 at the portion to which the piezoelectric ceramics 12 are attached is equal to the thickness at the driving force transmitting portion. The piezoelectric ceramics 12 are each formed with regions which are equally divided by the half-wavelength ($\lambda$) and polarized to provide piezoelectric effects which are alternately different in directivity. Each pair of adjacent regions divided by the half-wavelength are polarized in opposite relation to each other, i.e., + and —, in the direction of the thickness thereof. With the elastic member 11 and the two annular piezoelectric ceramics 12 defined as a stator 1, high frequency voltages which are 90° out of phase with each other are synchronously input to the piezoelectric ceramics 12 with matching attained in the electric resonance state including the elastic member 11. In consequence, a phonomenon which is similar to the generation of a progressive wave shown in FIG. 5 occurs on each of the upper and lower outer peripheral annular surfaces of the elastic member 11. It should be noted that two-phase sine waves are generated from an oscillator, one of the two-phase sine waves being phase-shifted 90° by use of a phase shifter, thus inputting a sine wave and a cosine wave to the two piezoelectric ceramics, respectively, after the electric signals have been amplified through respective wideband, high-output power amplifiers.

In addition, the stator 1 has a flange portion 15 at a position which is inwardly separate from the portion to which the two piezoelectric ceramics 12 are attached. The lower surface 151 of the flange portion 15 and the upper surface 441 of a flange portion 44 that is provided on the outer side of an annular support member 4 made of a rigid material are connected through a polymer member 3. The connection between the stator 1 and the support member 4 is effected in such a manner that a ring-shaped polymer member 3 consisting essentially of acrylonitrile-butadiene rubber is bonded to the flange portion 44 and the face of the flange portion 15 of the stator 1 is connected to the face of the flange portion 44 through the frictional force derived from the polymer member 3.

The interface (i.e., the position of the polymer member) of the connection between the stator 1 and the support member 4 is disposed on the neutral plane P of the bending vibration, and a face 152 of the flange portion 15 of the stator 1 at the side thereof which is remote from the face 151 is contacted by no member or portion (i.e., in a free state).

In this embodiment, the radial width X of this joint portion is 6 mm, the thickness $T_4$ of the flange portion 15 of the stator 1 is 0.7 mm, the thickness $T_5$ of the flange portion 44 of the support member 4 is 4 mm, the radial width of the polymer member 3 is 5 mm, and the thickness thereof is 0.5 mm.

A circular rotor 2 is mounted on the driving force transmitting portion 13. The rotor 2 comprises a rotor member 21 made of an elastic material, e.g., a metal, and a friction member 22 comprising a material which has a large friction factor and which can efficiently convert the vibration energy into torque energy, e.g., engineering plastics, the friction member 22 being bonded to the rotor member 21. The friction member 22 of the rotor 2 is placed in contact with the projections 14 of the stator 1, thereby bringing the rotor 2 into press contact with the stator 1.

The rotor 2 is brought into press contact with the stator 1 by a mechanism that comprises a dish spring 52 that applies compressive force to the upper side of the rotor 2 through a damping material 51, e.g., a rubber, which serves as both a slip-proof member and a vibration-proof member. More specifically, the dish spring 52 is secured by a shaft 53, which is supported at the upper end thereof by a thrust bearing 54, and a cover 55 is secured by screwing to the support member 43 which also serves as a pedestal. With this structure, the shaft 53 is supported at both ends thereof by the thrust bearing 54 and a radial bearing 56 which is provided in the pedestal 43 and, therefore, no run-out occurs.

Figure 46:
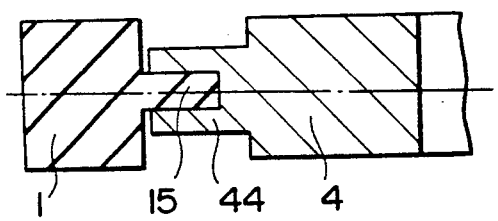
FIG. 46 is a sectional view of a joint of a vibrator and a support member in an ultrasonic motor according to one comparative example.

For comparison, an ultrasonic motor having the same structure as that of this embodiment except that the flange portion 15 of the stator 1 was clamped by the flange portion 44 of the support member 4 to connect together the stator 1 and the support member 4, as shown in FIG. 46, was prepared.

The mechanical vibration conditions of the above-described two different types of ultrasonic motor were observed. More specifically, observation was conducted by a method wherein a double exposure hologram was made for a vibratory state and stationary state of the longitudinal vibration of the stator by use of a double-pulse laser light source, thereby obtaining an interference mode corresponding to the vibrational amplitude.

Figure 47A:
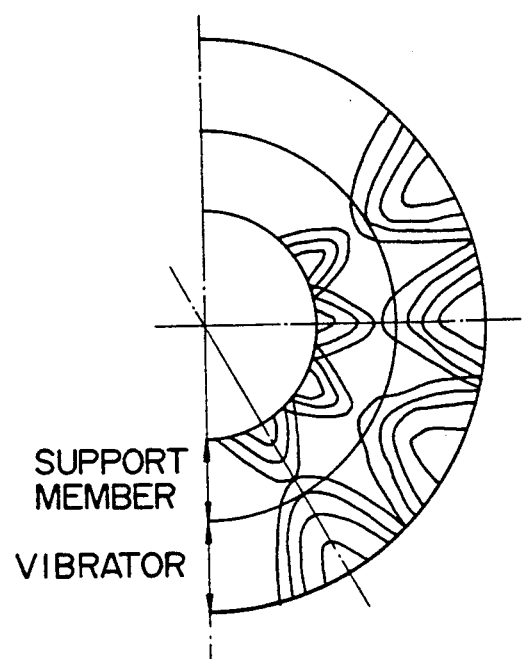
FIG. 47 are diagrams showing the displacement of the vibrational amplitude of the vibrator of the ultrasonic motor in the comparative example, in which in FIG. 47(a) shows a longitudinal displacement distribution on the vibrator.
FIG. 47(b) shows longitudinal displacements in respective radial sections of the vibrator and the support member.
Figure 47B:
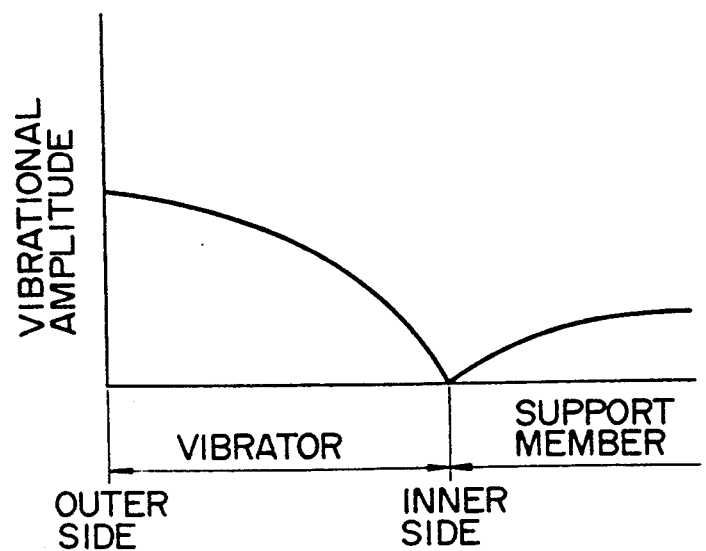
Figure 48A:
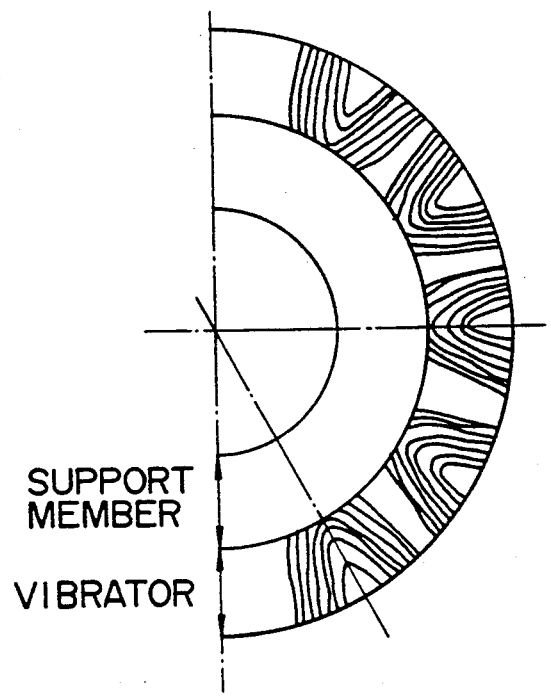
FIG. 48(a) shows a longitudinal displacement distribution on the vibrator.
Figure 48B:
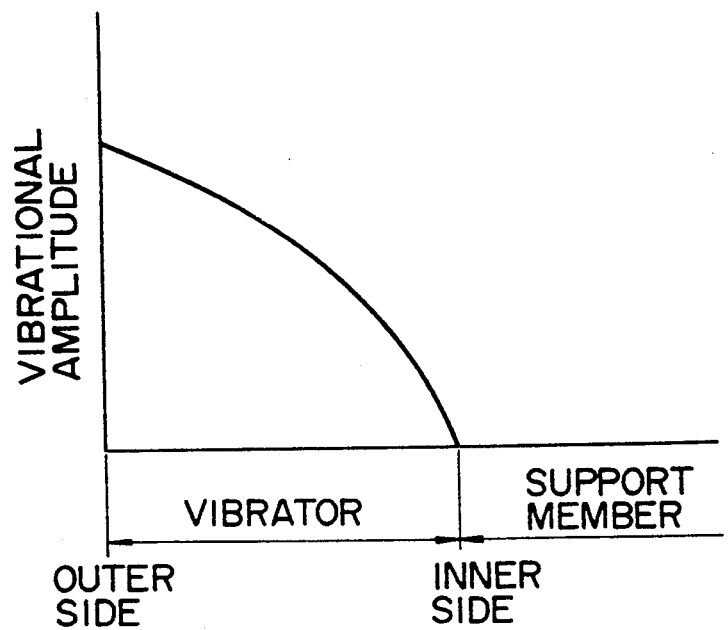
FIG. 48(b) shows longitudinal displacements in respective radial sections of the vibrator and the support member.

The results of the observation are shown in FIG. 47 (the comparative example) and FIG. 48 (this embodiment). As will be clear from FIGS. 47 and 48, in the comparative example the vibrational amplitude of the vibrator (stator) is relatively small due to the unnecessary vibration generated in the support member, whereas, in this embodiment no unnecessary vibration is generated in the support member and there is therefore no possibility that the vibrational amplitude of the vibrator (stator) will become small. Accordingly, in this embodiment no unnecessary vibration is generated in and propagated to the support member.

EMBODIMENT 7

In this embodiment, as shown in FIGS. 42 and 43, the vibrator (stator) 1 and the support member 4 are joined together through flange portions 15 which are not continuously over the inner peripheral surface of the stator 1 but locally provided thereon, and grooves 443 which correspond to the flange portions 15 are provided in the flange portion 44 of the support member 4, the grooves 443 being fitted with the flange portions 15 of the stator 1. This embodiment is similar to the embodiment 6 except for the above-described structure.

With this structure, the rotation of the stator 1 which cannot be prevented by use of the polymer member 3 can be effectively prevented by the grooves 443 provided in the flange portion 44 of the support member 4. In addition, since one side of the flange portion 15 of the stator 1 is not in contact with any member or portion but in a free state, unnecessary vibration is not readily generated and there is no possibility of unnecessary vibration being propagated to the support member 4.

EMBODIMENT 8

FIG. 52 is a sectional view of a progressive wave type ultrasonic motor according to this embodiment. An elastic member 11, which is made of nickel chromium steel, has a circular configuration. The elastic member 11 has a symmetrical cross-sectional configuration with respect to both the axial center line and the diametrical center line. The elastic member 11 has radial projections 14 provided on both the upper and lower outer peripheral annular surfaces, the projections 14 being equally spaced circumferentially. Two annular piezoelectric ceramics 12 made of PZT [Pb (Zr,Ti) O$_3$] are disposed on the upper and lower surfaces, respectively, of the elastic member 11, which are inward of the outer peripheral surfaces, the piezoelectric ceramics 12 being spatially offset from each other by the quarter-wavelength. Thus, a stator 1 is formed. It should be noted that the thickness of the elastic member 11 at the portion to which the piezoelectric ceramics 12 are attached is equal to the thickness at the driving force transmitting portion. The piezoelectric ceramics 12 are each formed with regions which are equally divided by the half-wavelength ($\lambda$) and polarized to provide piezoelectric effects which are alternately different in directivity. Each pair of adjacent regions divided by the half-wavelength are polarized in opposite relation to each other, i.e., + and −, in the direction of the thickness thereof. With the elastic member 11 and the two annular piezoelectric ceramics 12 defined as a vibrator (stator) 1, high frequency voltages from an oscillator (not shown) which are 90° out of phase with each other are synchronously input to the piezoelectric ceramics 12 with matching attained in the electric resonance state including the elastic member 11. In consequence, a phenomenon which is similar to the generation of a progressive wave shown in FIG. 5 occurs on each of the upper and lower outer peripheral annular surfaces of the stator 1. It should be noted that the oscillator generates two-phase sine waves, and one of the two-phase sine waves is phase-shifted 90° by use of a phase shifter, thus inputting a sine wave and a cosine wave to the two piezoelectric ceramics, respectively, after the high-frequency electric signals have been amplified at high speed.

The stator 1 is supported at the outer peripheral neutral plane thereof by an annular support member 4, which is connected to a fixed member 43 through a sound absorbing material 45.

Two rotors 2 are brought into press contact with the driving force transmitting portion 13 of the stator 1 in such a manner that the driving force transmitting portion 13 is clamped by the rotors 2 from the upper and lower sides thereof. Each rotor 2 comprises a rotor member 21 made of an aluminum alloy and a friction member 22 made of engineering plastics which has a large friction factor and which can efficiently convert the vibration energy into torque energy. The rotors 2 are pressed by means of an annular dish spring 52 for low load. More specifically, the dish spring 52 is secured by a shaft 53, and with a thrust bearing 54 provided at the upper end of the shaft 53, a cover 55 is secured by screwing to a pedestal 43 which also serves as a support member.

The feature of the ultrasonic motor with this structure resides in that the stator 1 is annularly supported at the outer peripheral neutral plane thereof. It is possible to utilize the conventional rotors, dish spring and so forth as they are without particularly employing the means (shown in FIGS. 53 to 62) for connecting the upper and lower rotors.

EMBODIMENT 9

FIG. 53 is a sectional view of an ultrasonic motor according to this embodiment.

In the ultrasonic motor of this embodiment, a stator 1 has a support portion 4 defined by a lower annular portion which is inwardly separate from a portion to which two piezoelectric ceramics are attached, and an upper rotor 2 is pressed by use of a dish spring 52, whereas a lower rotor 2 is pressed by use of a corrugated ring spring or other type of ring spring 72. The two rotors 2 are joined together in one unit by a rotor guide 71. In addition, a radial bearing 56 is interposed between a shaft 53 and a cover 55. This embodiment is similar to the embodiment 8 except for the above-described structure.

Since in the ultrasonic motor with the above-described structure the stator 1 is supported near the central portion, the conventional stator supporting method can be utilized as it is and the means shown in FIGS. 54 to 62 can be employed. In addition, it is possible to reduce the overall weight of the motor in comparison to the embodiment 8.

EMBODIMENT 10

Figure 64:
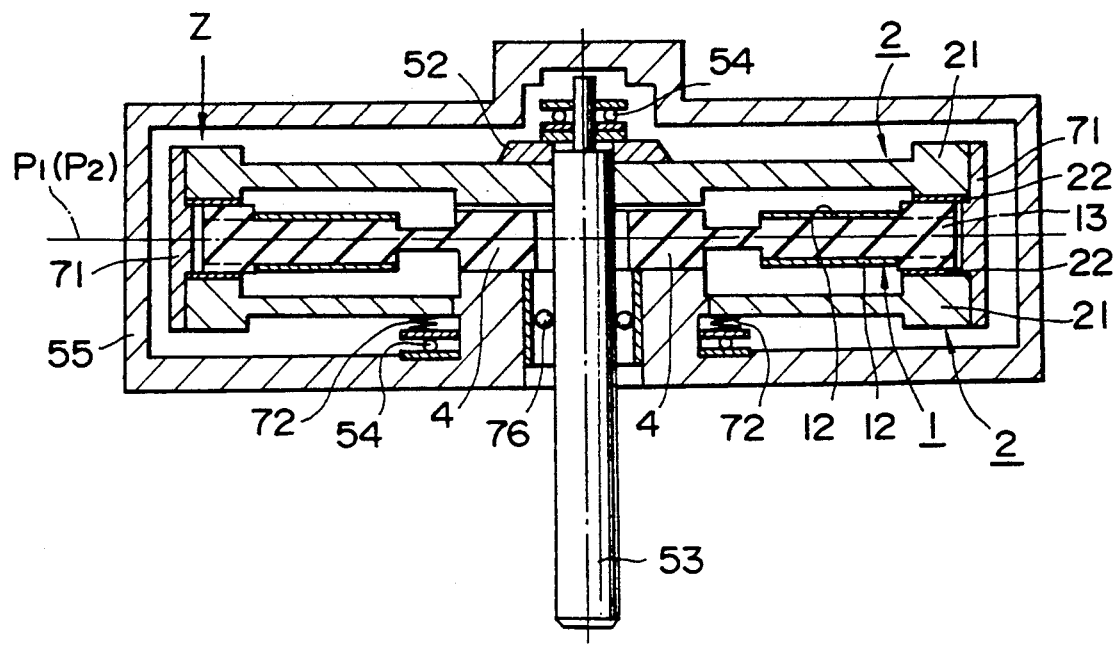
FIG. 64 is a sectional view of an ultrasonic motor according to one embodiment of the present invention.
Figure 65:
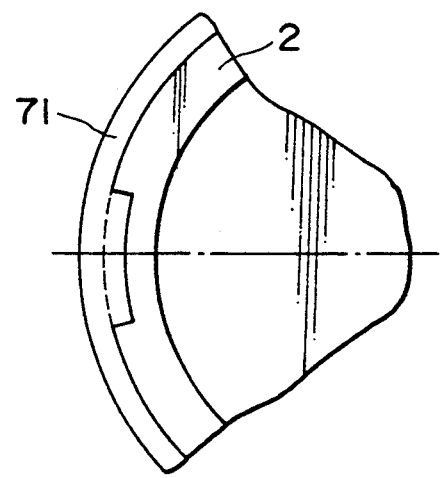
FIG. 65 is a plan view of an area of contact between a vibrator and rotor of the ultrasonic motor shown in FIG. 64, seen from the direction of the arrow Z.

FIG. 64 is a sectional view of an ultrasonic motor according to this embodiment, and FIG. 65 is a plan view seen from the direction of the arrow Z in FIG. 64.

In the ultrasonic motor of this embodiment, a stator 1 has a support portion 4 defined by a lower annular portion which is inwardly separate from a portion to which two piezoelectric ceramics are attached, and an upper rotor 2 is pressed by use of a dish spring 52, whereas a lower rotor 2 is pressed by use of a ring spring 72 (a dish spring may be employed instead) and a thrust bearing 54. The two rotors 2 are joined together in one unit by a rotor guide 71. In addition, a radial bearing 76 is interposed between a shaft 53 and a cover 55. This embodiment is similar to the embodiment 9 except for the above-described structure.

Since in the ultrasonic motor with the above-described structure the stator 1 is supported near the central portion, the conventional stator supporting method can be utilized as it is and the conventional rotors, dish spring and so forth can be utilized without a change or modification.

COMPARATIVE EXAMPLE 5

Figure 66:
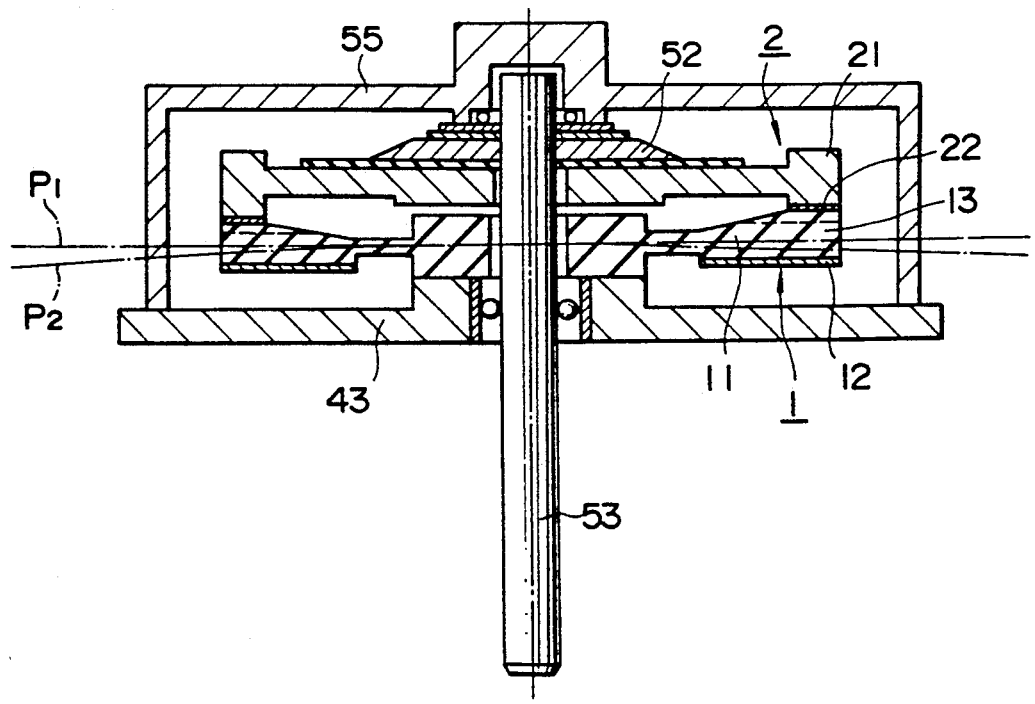
FIG. 66 is a sectional view of an ultrasonic motor according to a comparative example.

FIG. 66 is a sectional view of an ultrasonic motor according to this comparative example.

The ultrasonic motor of this comparative example is arranged such that a single piezoelectric ceramic 12 is attached to the lower side of the outer peripheral portion of a vibrator 1 and a rotor 2 is brought into press contact with only the upper side of the outer peripheral portion where the bending vibration of the vibrator 1 is generated. This example is similar to the embodiment 9 except for the above-described structure.

Figure 5:
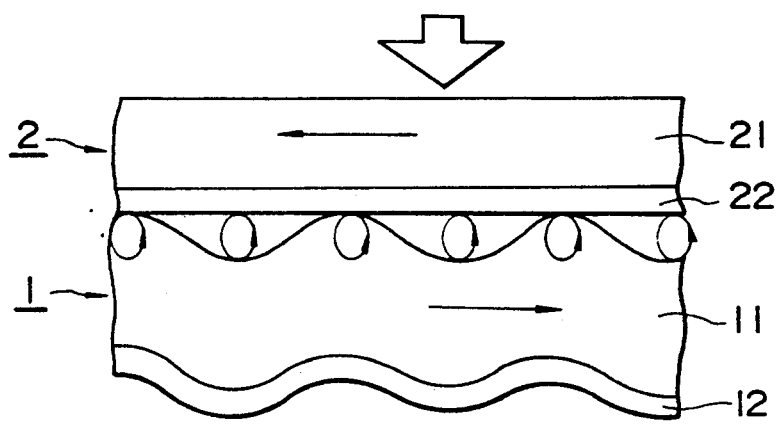
FIG. 5 is a conceptual view showing the principle of generation of a progressive wave in the ultrasonic motor.

In the ultrasonic motor with this structure, the pressure applied by the rotor acts in only one direction and a pressure application means is present directly above the piezoelectric ceramic 12; therefore, the bending vibration of the piezoelectric ceramic 12 is restricted by the rotor provided at the upper side and hence the vibrational amplitude is held down to a relatively low level, as shown in FIG. 5, so that no high torque can be expected from this motor arrangement. In addition, since the neutral axis of the vibrator 1 is bent diametrically by the pressure applied from one direction, as shown in FIG. 66, slipping occurs between the rotor 2 and the vibrator 1.

EMBODIMENT 11

Figure 67:
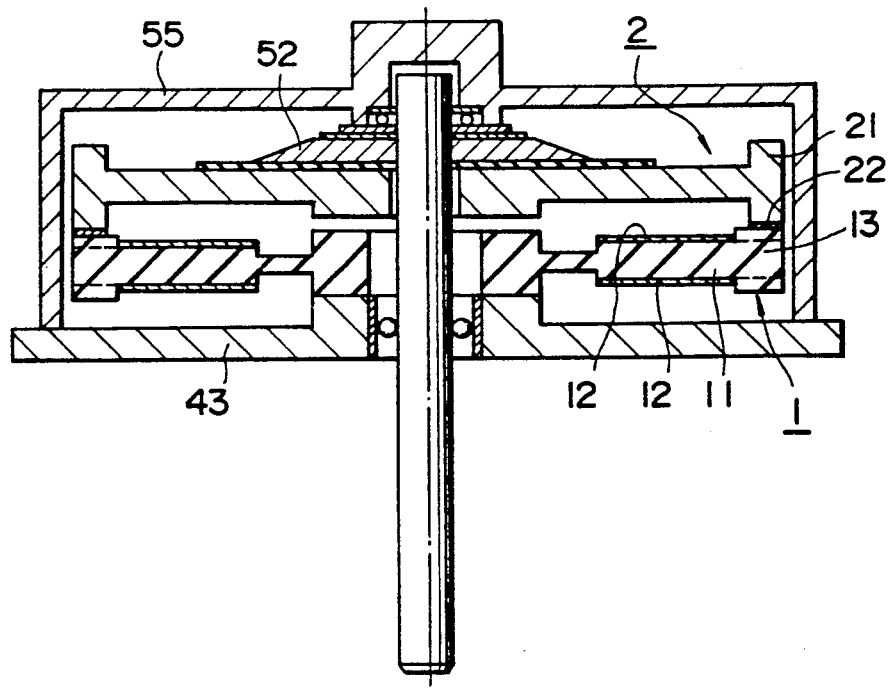
FIG. 67 is a sectional view of an ultrasonic motor according to one embodiment of the present invention.

FIG. 67 is a sectional view of an ultrasonic motor according to this embodiment.

In the ultrasonic motor of this embodiment, two piezoelectric ceramics 12 are attached to a portion of a vibrator 1 which is inward of a driving force transmitting portion 13 provided at the outer periphery of the vibrator 1, and a rotor 2 is brought into press contact with only the upper side of the driving force transmitting portion 13. This embodiment is similar to the embodiment 9 except for the above-described structure.

In this embodiment, the driving force transmitting portion 13, which is provided outwardly of the piezoelectric ceramics 12, less restricts the bending vibration of the piezoelectric ceramics 12 than in the case of the comparative example 5, as shown in FIG. 5.

In the comparative example 5, the vibration neutral axis $P_1$ of the vibrator before being assembled into an ultrasonic motor and the neutral axis $P_2$ after the assembly are deviated from each other by the pressure applied from one direction by the rotor, as shown in FIG. 66, whereas, in the embodiments 8, 9 and 10, the diametrical bending of the vibrator is prevented so that $P_1$ and $P_2$ can be made coincident with each other, as shown in FIGS. 52, 53 and 64. Accordingly, it is possible to minimize slipping and enlarge the frictional surface.

What is claimed is:

1. An ultrasonic motor comprising:
   at least one vibrator comprising:
   a disk-shaped elastic member having a driving force transmitting portion,
   disk-shaped piezoelectric ceramics attached to both surfaces of said elastic member,
   said elastic member having a thickness $T_1$ at a portion between said piezoelectric ceramics and a thickness $T_2$ at said driving force transmitting portion and wherein a ratio of $T_1$ to $T_2$ is in the range of 0.8 to 1.3,
   a plurality of projections associated with both sides of said elastic member at said driving force transmitting portion such that said plurality of projections and said driving force transmitting portion together form means for transmitting a driving force; and
   at least one rotor that is in press contact with said driving force transmitting portion of said vibrator.

2. An ultrasonic motor according to claim 1, wherein the ratio of the surface area of said elastic member at said driving force transmitting portion except said projections to the surface area of said elastic member between said piezoelectric ceramics is in the range of from 0.5 to 1.0.

3. An ultrasonic motor according to claim 1, wherein said projections extend radially inwardly from the outer peripheral surface of said vibrator over a distance which is not more than one eighth of the wavelength of vibratory wave generated.

4. An ultrasonic motor according to claim 1, wherein said projections are provided on the outer periphery of said vibrator with equal spacing therebetween and the relationship h/w betweem the circumferential length w and axial height h of each projection is in the range of from 0.5 to 10.

5. An ultrasonic motor according to claim 1, wherein two vibrators with said structure are in press contact with the upper and lower surfaces, respectively, of said rotor.

6. An ultrasnic motor according to claim 1, wherein said driving force transmitting portion of said vibrator is in press contact with at least two rotors.

7. An ultrasonic motor according to claim 6, wherein said two rotors are in contact with said driving force transmitting portion with the same level of pressure.

8. An ultrasonic motor according to claim 6, wherein said two rotors are provided with pressure application means having spring action.

9. An ultrasonic motor according to claim 6, wherein the ratio of a vibration amplitude value $l_1$ of said rotor to a half amplitude value $l_2$ of said vibrator is in the range of from about $\frac{1}{2}$ to about $\frac{1}{4}$.

10. An ultrasonic motor according to claim 6, wherein said two rotors are connected together by a rotor guide.

11. An ultrasonic motor according to claim 6, wherein said two rotors are connected together by a combination of a connecting bar and a coil spring.

12. An ultrasonic motor according to claim 6, wherein said two rotors are connected together by a coil spring only.

13. An ultrasonic motor according to claim 6, wherein several ring-shaped or split sectorial conneting springs are provided around the circumference of said two rotors at equally spaced positions.

14. An ultrasonic motor according to claim 6, wherein several ring-shaped or split sectorial connecting fasteners are provided around the circumference of said two rotors at equally spaced positions.

15. An ultrasonic motor according to claim 1, wherein said vibrator is connected to a support member through a polymer member made of a polymer compound with vibration-proof properties, a face of said vibrator which is opposed to the face thereof that is in contact with said polymer member being free.

16. An ultrasonic motor according to claim 15, wherein said vibrator is provided with split flange portions, said support member being provided with grooves which are split to correspond to said flange portions.

17. An ultrasonic motor according to claim 15, wherein said polymer member has an acoustic impedance largely different from that of said vibrator and further has a high friciotion factor.

18. An ultrasonic motor according to claim 15, wherein the radial width of the joint surface of said vibrator and said support member is in the range of from $(D_2-D_1)/3$ to $(D_2-D_1)$, where $D_1$ and $D_2$ are the inner and outer diameters, respectively, of said vibrator.

19. An ultrasonic motor according to claim 15, wherein the thickness $T_4$ of the portion of said vibrator which is connected to said support member is in the range of from 1 to 2 mm, while the thickness of the portion of said support member which is conneted to said vibrator is not smaller than $5T_4$.

20. The ultrasonic motor of claim 1, wherein said plurality of projections are provided integral with said elastic member.

21. The ultrasonic motor of claim 1, wherein said plurality of projections are formed separate of said elastic member.

22. The ultrasonic motor of claim 1, wherein $T_1$ is substantially equal to $T_2$.

* * * * *